(12) United States Patent
Patil

(10) Patent No.: US 10,031,738 B2
(45) Date of Patent: Jul. 24, 2018

(54) PROVIDING APPLICATION RECOMMENDATIONS

(71) Applicant: Samsung Electronics Co., Ltd., Suwon-si, Gyeonggi-do (KR)

(72) Inventor: Sameer Patil, Santa Ana, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 894 days.

(21) Appl. No.: 14/498,760

(22) Filed: Sep. 26, 2014

(65) Prior Publication Data

US 2016/0092768 A1 Mar. 31, 2016

(51) Int. Cl.
*G06F 17/00* (2006.01)
*G06F 8/65* (2018.01)
*G06F 8/61* (2018.01)

(52) U.S. Cl.
CPC . *G06F 8/65* (2013.01); *G06F 8/61* (2013.01)

(58) Field of Classification Search
CPC ...................................................... H04L 51/32
USPC ...................................................... 706/15, 45
See application file for complete search history.

(56) References Cited

U.S. PATENT DOCUMENTS

| 8,914,399 | B1* | 12/2014 | Paleja | G06F 17/30867 |
| | | | | 705/26.61 |
| 2013/0226937 | A1* | 8/2013 | Moritz | G06F 17/3087 |
| | | | | 707/748 |
| 2015/0081660 | A1* | 3/2015 | Margulis | G06Q 30/0263 |
| | | | | 707/706 |
| 2016/0227343 | A1* | 8/2016 | Shen | G06F 8/61 |

* cited by examiner

*Primary Examiner* — David R Vincent
(74) *Attorney, Agent, or Firm* — Jefferson IP Law, LLP

(57) ABSTRACT

An example system includes a similarity module, a selection module, and a messaging module. The similarity module may receive a first set of application identifiers identifying applications downloaded or installed on at least one digital device, compare the first set of application identifiers to a second set of application identifiers identifying applications of at least one other user, generate a similarity value based on the comparison, and when the similarity value exceeds a similarity threshold, determine that the first and second sets are sufficiently similar. If the first and second sets are sufficiently similar, the selection module may determine at least one application identifier in the second set that is not in the first set. The messaging module may provide a recommendation to the first user, the recommendation including the at least one application identifier in the second set that is not in the first set.

19 Claims, 11 Drawing Sheets

PROVIDING APPLICATION RECOMMENDATIONS

TECHNICAL FIELD

The present disclosure generally relates to providing recommendations to one or more users, and more particularly, to techniques for identifying applications of potential interest and providing recommendations based on the applications of potential interest.

BACKGROUND

The installation and use of applications on different devices is becoming increasingly common. Many users discover applications to download from a myriad of sources. In order to download or learn about an application, however, the user is often required to be aware of and be able to identify the desired application (e.g., by name). As a result, application discovery by users may be a result of happenstance. Some users learn about an application only if they stumble upon a news article, listen to technology podcasts, or encounter advertising (e.g., on digital distribution platforms, TV, radio, or the like.). Other users may have friends who may occasionally discuss and suggest applications. Many users, however, would install and utilize applications if they were made aware of the different applications available.

SUMMARY

In various implementations, a system includes a similarity module, a selection module, and a messaging module. The similarity module may receive a first set of application identifiers identifying applications downloaded or installed on at least one digital device, compare the first set of application identifiers to a second set of application identifiers identifying applications of at least one other user, generate a similarity value based on the comparison, and determine that the first and second sets are sufficiently similar when the similarity value exceeds a similarity threshold. The selection module may, if the first and second sets are sufficiently similar, determine at least one application identifier in the second set that is not in the first set. The messaging module may provide a recommendation to the first user, the recommendation including the at least one application identifier in the second set that is not in the first set.

Implementations of the disclosure may include one or more of the following features. In some implementations, the at least one digital device is a mobile device. The recommendation may also further include at least one interactive element (e.g., a link) enabling the first user to download or view information about the at least one application associated with the application identifier in the recommendation. In some embodiments, the similarity module is configured to identify applications downloaded or installed, on the at least one digital device and generate the first set of application identifiers, the first set of application identifiers identifying at least one of the identified applications downloaded or installed on the digital device. In various embodiments, the similarity module is configured to identify, by a Web site, applications downloaded or installed by the first user from the Web site and generate the first set of application identifiers, the first set of application identifiers identifying at least one of the identified applications downloaded or installed by the first user.

The similarity module may be configured to compare the first set of application identifiers to the second set of application identifiers identifying applications downloaded or installed by a group of other users. In some embodiments, the similarity module is further configured to identify the group of other users from a plurality of groups based on at least one characteristic of the first user. The second set of application identifiers identifying applications downloaded or installed by the group of other users may include application identifiers identifying applications downloaded and installed by a subgroup of a larger group. The subgroup may be a majority of a larger group.

Some aspects of the disclosure provide a method comprising receiving a first set of application identifiers identifying applications downloaded or installed on at least one digital device and associated with a first user, comparing the first set of application identifiers to a second set of application identifiers identifying applications downloaded or installed by at least one other user, generating a similarity value based on the comparison by determining similarity between the first and second sets of application identifiers, determining that the first and second sets are sufficiently similar when the similarity value exceeds a similarity threshold, and if the first and second sets are sufficiently similar: determining at least one application identifier in the second set that is not in the first set and providing a recommendation to the first user, the recommendation including the at least one application identifier in the second set that is not in the first set.

Further, some aspects of the disclosure provide a system including non-transitive memory comprising executable instructions. The instructions may be executable by a data processing device to perform a method. The method may comprise receiving a first set of application identifiers identifying applications downloaded or installed on at least one digital device and associated with a first user, comparing the first set of application identifiers to a second set of application identifiers identifying applications downloaded or installed by at least one other user, generating a similarity value based on the comparison by determining similarity between the first and second sets of application identifiers, determining that the first and second sets are sufficiently similar when the similarity value exceeds a similarity threshold, and if the first and second sets are sufficiently similar: determining at least one application identifier in the second set that is not in the first set and providing a recommendation to the first user, the recommendation including the at least one application identifier in the second set that is not in the first set.

BRIEF DESCRIPTION OF THE DRAWINGS

Like reference symbols in the various drawings indicate like elements.

DETAILED DESCRIPTION

Figure 1:
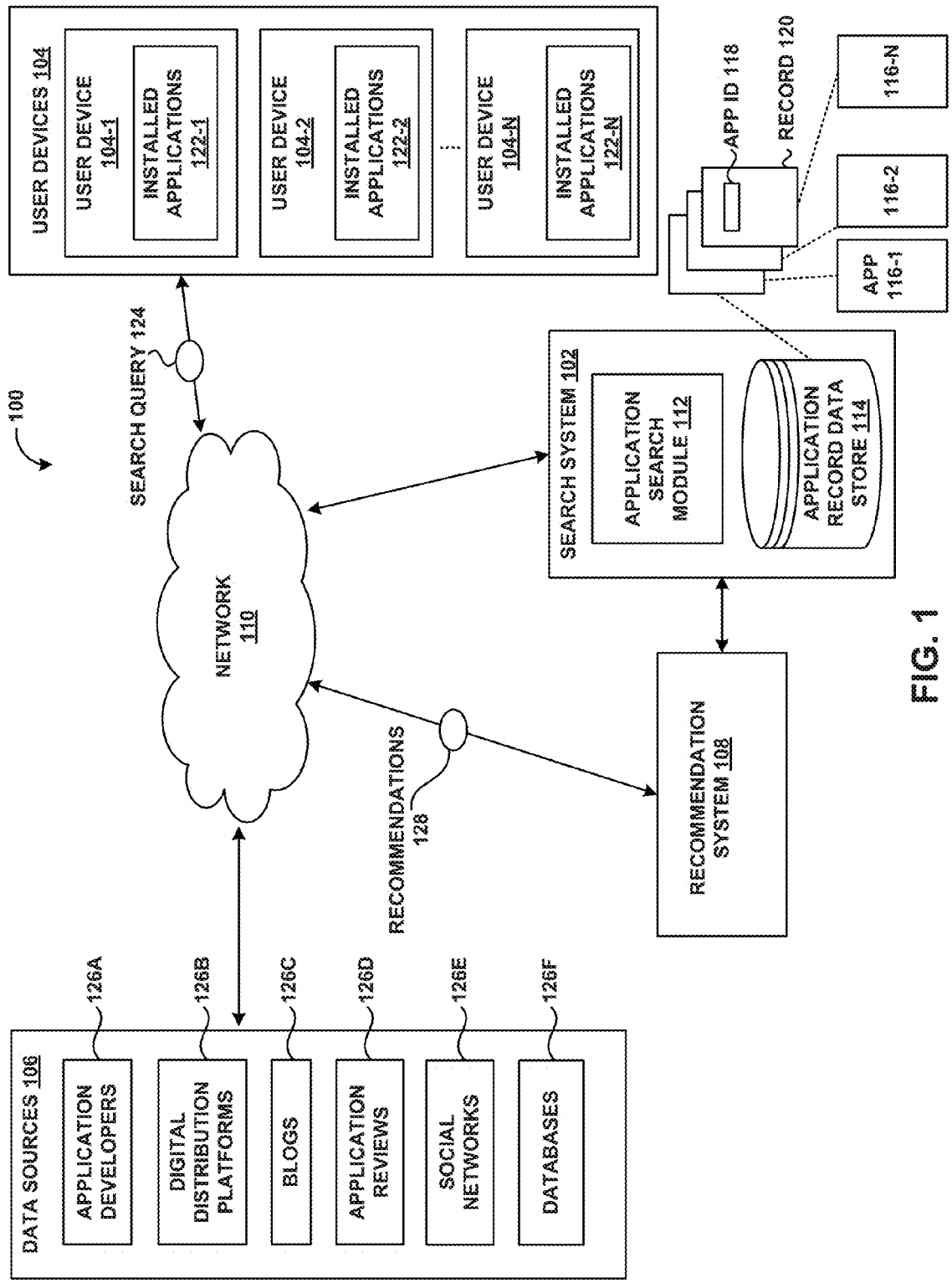
FIG. 1 illustrates an environment including a search system, user devices, and a recommendation system in communication over a network in some embodiments.

An application recommendation system determines application(s) of potential interest for a user and provides the user a recommendation for one or more of the applications. The recommendation may include, for example, names of one or more applications that identify the application(s) of potential interest. The recommendation may also include one or more interactive elements (e.g., links) associated with the application names to enable the user to download or learn more about (e.g., preview) one or more of the recommended applications.

Many users may utilize many of the same applications. For example, within a group of users with common interests, many users may use many of the same applications. While many applications may be utilized by a large number of users, there may be other users within this group who do not take advantage of every application utilized by the entire group. Those users within this group may not utilize those applications because they may be unaware of the applications and/or information about the applications.

The application recommendation system may determine applications of potential interest by examining a set of applications downloaded or installed by a requesting user. The application recommendation system may utilize information regarding the requesting user's set of applications to identify similar sets of applications downloaded or installed by one or more other users. Subsequently, applications are identified that are members of the similar sets of applications of the other users but not a member of the requesting user's set of applications. The application recommendation system may recommend the identified applications to the requesting user as applications of potential interest. For example, the application recommendation system may recommend an application that is not a member of the requesting user's set of applications but is, however, a member of one or more other sets of applications that are similar to the requesting user's set.

An application can be identified (e.g., uniquely identified) by an application identifier and/or application name. A set of applications may include application identifiers and/or names for each of the applications in the set. In one example, application identifiers and/or names in a set may identify applications that are downloaded or installed by a user. Similar sets of applications are sets with similar membership (i.e., a number of the same applications are members of two or more sets). It will be appreciated that, although sets of applications between different users may be similar, there will often be some applications in one set that is not in a similar set.

The application recommendation system may identify applications that are not members of the requesting user's set of applications but are members of other, similar sets of applications. The application recommendation system may provide a recommendation (e.g., via search results, email, text, server message, or the like) for one or more applications of potential interest that are not a member of the requesting user's set but are a member of similar sets. The recommendation may include application identifiers and/or names that identify applications of potential interest as well as a link (e.g., a hyperlink) to download or access information related to the application.

FIG. 1 is illustrates an environment 100 including a search system 102, user devices 104, and a recommendation system 108 each in communication over a network 110 in some embodiments. The network 110 may include various types of networks, such as a local area network (LAN), wide area network (WAN), and/or the Internet. At a high level, the recommendation system 108 recommends applications (i.e., applications of potential interest) to a user to enable the user to download or receive information regarding any or all of the recommended applications. In some embodiments, the search system 102 receives a search query 124 from a user device 104-1, finds applications (e.g., using information from the search query 124), and generates search results (e.g., including links to download applications identified in the search results).

The search results may include recommendations 128 generated by the recommendation system 108. The search results may include data for generating user selectable links to download applications (see FIG. 5). The data may include application download addresses for downloading/previewing the app, text that describes the app, and images (e.g., icons and/or screenshots) for the application.

Figure 2:
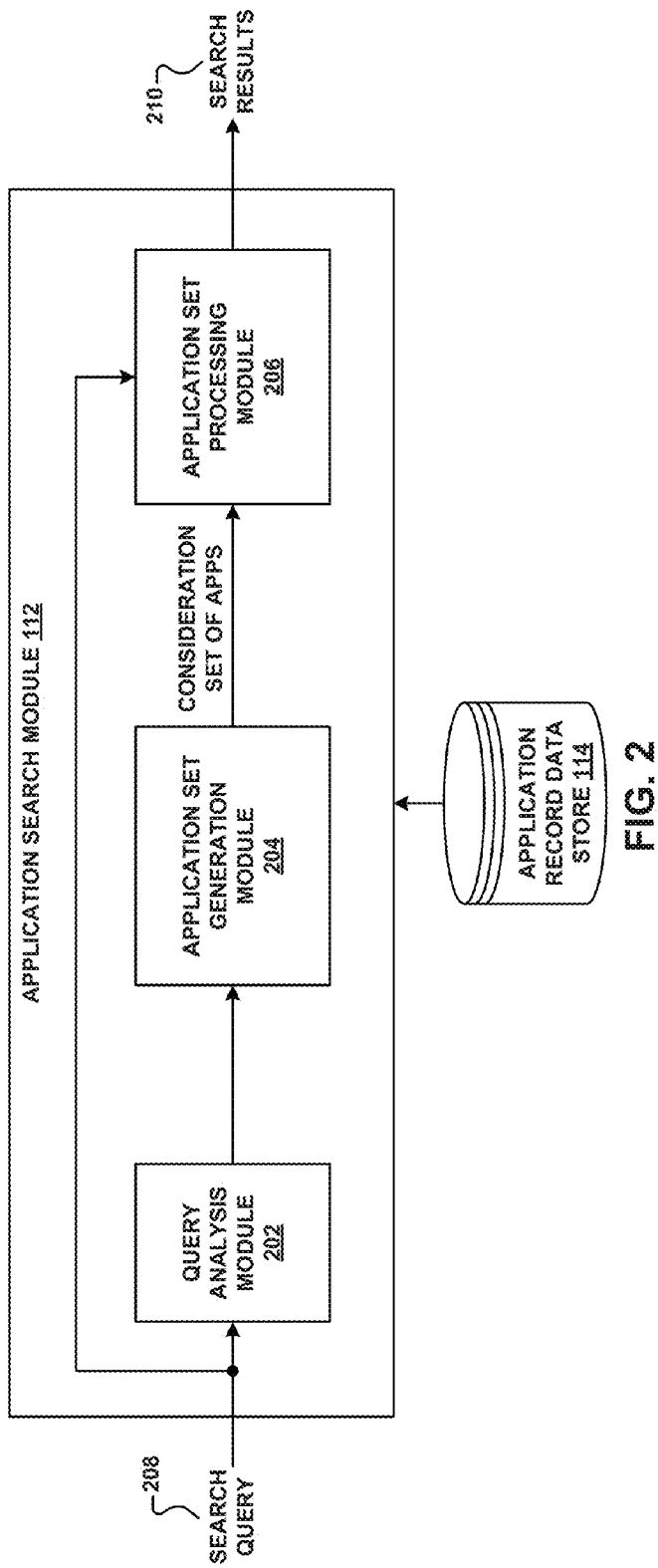
FIG. 2 shows an application search module which may be included in the search system in some embodiments.
Figure 3B:
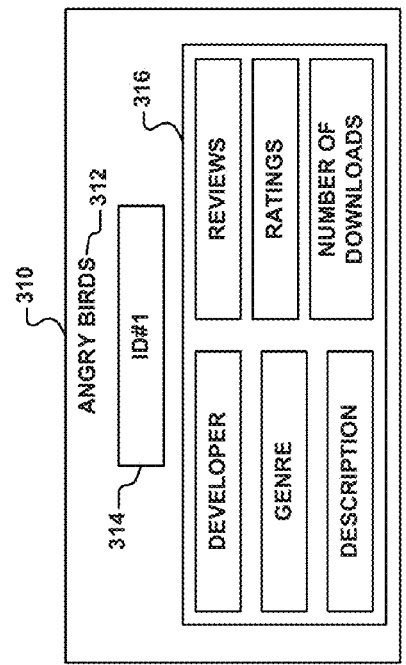
FIGS. 3A-3B illustrate application records in some embodiments.
Figure 3A:
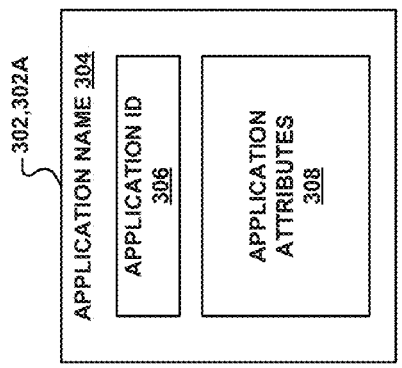

With reference to FIGS. 2, 3A, and 3B, in some implementations, the search system 102 receives a search query 124 from a user devices 104, via the network 110, and performs a search for applications 116 using the search query 124. Each of the user devices 104-1 . . . 104.N can provide search queries to the search system 102 and receive search results from the search system 102.

The search system 102 includes an application search module 112 and an application record data store 114. In some implementations, the application search module 112 receives the search query 124 (see search query 208 of FIG. 2) from a user device 104 (e.g., user device 104-1) and generates a search result set 210 (see FIG. 2), such as a list, based on the data from the application record data store 114. For example, the application search module 112 may generate a search result set 210 based on the search query 124 and the records 120 stored in the application record data store 114 (e.g., utilizing all or part of the search query 124 to retrieve information from any number of records 120). The search system 102 may transmit the search result set 210 to the user device 104 (e.g., user device 104-1) that transmitted the search query 124 and/or any other device.

In some embodiments, the application search module 112 searches and/or otherwise utilizes records 120 to identify applications 116-1 . . . 116-N (e.g., by corresponding application identifier 118—see FIG. 3A). Each record 120 may identify an application (e.g., application 116-1) with an application identifier 118 and may include an associated result score. The result score may indicate a relevance of the application to the search query 124. In various embodiments, the application search module 112 computes the result score based on information contained in the record 120. The result score may be computed in real time.

The application record data store 114 includes a variety of different types of data related to different applications 116 including, for example, application records as described herein. The application record data store 114 may include one or more databases, indices (e.g., inverted indices), files, or other data structures which may be used to implement the techniques of the present disclosure. As described herein, the data included in the application record data store 114 may include descriptions of applications 116, statistics related to applications (e.g., download numbers, review numbers, or the like), and other information.

An application 116 (e.g., application 116-1) may refer to a package of computer software developed to be executed on a computing device platform that causes a computing device to provide one or more functions. In some examples, a software application may be referred to as an "application," an "app," or a "program." Example applications 116 include, but are not limited to, word processing applications, spreadsheet applications, messaging applications, media streaming applications, social networking applications, and gaming applications.

Applications 116 can be executed on a variety of different computing devices (e.g., user devices 104-1 . . . 104-N). For example, some applications 116 can be executed on mobile computing devices such as smart phones, tablets, and wearable computing devices (e.g., headsets and/or watches). Applications 116 can also be executed on other types of computing devices having other form factors such as laptop computers, desktop computers, or other consumer electronic devices. In some examples, applications 116 may be installed on a computing device prior to a user purchasing the computing device. In other examples, the user may download and install applications 116 on the computing device 104.

Functionality of an application 116 may be accessed on the user device 104 on which the application 116 is installed These applications 116 may function without communication with other computing devices (e.g., without communicating over the Internet).

Some applications 116 installed on a user device 104 may access information from other remote computing devices during operation. For example, a weather application installed on a user device 104 may access the latest weather information via the Internet (e.g., via network 110) and display the accessed weather information to the user through the installed weather application.

User devices 104 can be any computing devices (e.g., digital devices) that are capable of providing search queries 124 to the search system 102. A digital device is any device with a processor and memory. A digital device is further discussed in FIG. 12. User devices 104 include, but are not limited to, smart phones, tablet computers, wearable computing devices (e.g., head-mounted displays and wrist watches) laptop computers, and desktop computers. User devices 104 may also include other computing devices having other form factors, such as computing devices included in vehicles, gaming devices, televisions, or other appliances (e.g., networked home automation devices and home appliances).

Each user device 104 includes "installed applications" that represent applications installed on the user device. For example, each user device 104-1 . . . 104-N may include installed applications 122-1 . . . 122-N, respectively.

User devices 104 can communicate with the search system 102 via the network 110. In some examples, a user device 104 may communicate with the search system 102 using an application (e.g., a native application) installed on the user device 104, such as, for example, a search application. In general, a user device 104 may communicate with the search system 102 using any application that can transmit search queries 124 to the search system 102. In some examples, a user device 104 may run an application that is dedicated to interfacing with the search system 102 (e.g., an application dedicated to application searches). In other examples, a user device 104 may communicate with the search system 102 using a more general application, such as a Web browser application. An application run by a user device 104 to communicate with the search system 102 may display a search field on a graphical user interface (GUI) in which the user may enter search queries 124. The user may enter a search query 124, for example, using a touchscreen or physical keyboard, a speech-to-text program, or any other form of user input.

A search query 124 entered into a GUI displayed on a screen of a user device 104 may include words, numbers, and/or symbols. In general, a search query may be a request for information retrieval (e.g., search results) from the search system 102. For example, a search query 124 may be directed to retrieving a list of application names. A search query 124 directed to retrieving a list of application names may indicate a user's desire to access functionality of one or more native applications 116 described by the search query 124.

A user device 104 may receive a set of search results 210 from the search system 102 that are responsive to the search query 124 transmitted to the search system 102. The user device 104 may be running an application including a GUI that displays the search results 210 received from the search system 102. The GUI utilized to transmit the search query 124 may also display the search results 210 to the user.

The user device 104 may display the search results 210 to the user in a variety of different ways. For example, the search results may include a list of application download addresses (e.g., application download addresses such as a GOOGLE PLAY download address to download or preview an associated application) and/or link data. Link data may include text and/or images associated with different application download addresses in the list (See search results 210 of FIG. 2). The search system 102 may transmit the list of application download addresses to the user device 104 along with additional data to be displayed in user selectable links. In some examples, the GUI may display the search results to the user as a list of user selectable links including text and images. The text and images associated with the links may include native application names, text describing one or more native applications associated with the application download addresses, and images associated with the native applications (e.g., application icons).

The GUI may display the search results 210 on the user device 104 as a list of application names. The search system 102, or other computing system, may transmit additional information to the user device 104 including, but not limited to, application ratings, application download numbers, application screenshots, and application descriptions. In some implementations, this additional information may be stored in the application record data store 114 and transmitted by the search system 102 to the user device 104. In examples where the user device 104 receives this additional information, the GUI may display the additional information along with the list of application names. In some examples, the GUI may display the search results as a list of application names ordered from the top of the screen to the bottom of the screen, based on relevance. In some examples, the search results 210 may be displayed under the search field in which the user entered the search query 124 (see FIG. 5).

In some implementations, a user device 104-1 may allow the user to select one of the applications 116 identified in the search results in order to view information related to the application 116 and/or download the application 116 (e.g., by utilizing a link in the search results to download the application 116). In some embodiments, applications associated with the search results 210 may be accessed from many locations. For example, applications 116 identified in the search results may be downloadable from a digital distribution platform 126B which is configured to distribute the applications 116. Example digital distribution platforms 126B include, but are not limited to, GOOGLE PLAY® developed by GOOGLE INC., the APP STORE® developed by APPLE INC., and WINDOWS PHONE STORE® developed by MICROSOFT CORPORATION. In some embodiments, one or more applications or information regarding one or more applications associated with the search results 210 may be accessed from the search system 102.

In some embodiments, user devices 104 may communicate with the search system 102 via a partner computing system (not illustrated). The partner computing system may be a computing system of a third party that may leverage the search functionality of the search system 102. The partner computing system may belong to a company or organization other than that which operates the search system 102. Example third parties which may leverage the functionality of the search system 102 may include, but are not limited to, Internet search providers and wireless communications service providers. The user devices 104 may send search queries 124 to the search system 102 and receive search results via the partner computing system. The partner computing system may provide a user interface to the user devices 104 in some examples and/or modify the search experience provided on the user devices 104.

The user devices 104 may use a variety of different operating systems. In examples where a user device 104 is a mobile device, the user device 104 may run an operating system including, but not limited to, ANDROID® by GOOGLE INC., TIZEN® by TIZEN FOUNDATION, iOS® developed by APPLE INC., or WINDOWS PHONE® developed by MICROSOFT CORPORATION. In an example where a user device 104 is a laptop or desktop computing device, the user device 104 may run an operating system including, but not limited to, MICROSOFT WINDOWS, MAC OS, or LINUX. User devices 104 may also access the search system 102 while running operating systems other than those operating systems described above, whether presently available or developed in the future.

The data sources 106 may include a variety of different data providers. The data sources 106 may include data from application developers 126A, such as application developers' Web sites and data feeds provided by developers. The data sources 106 may include operators of digital distribution platforms 126B configured to distribute applications to user devices 104. The data sources 106 may also include other Web sites, such as Web sites that include Web logs (i.e., blogs 126C), application reviews 126D, or other Web sites that include data related to applications. Additionally, the data sources 106 may include social networking sites 126E, such as FACEBOOK® (e.g., FACEBOOK posts) and TWITTER® (e.g., text from tweets). Data sources 106 may also include additional types of data sources, such as databases 126F, in addition to the data sources described herein. For example, data sources 106 may also include online databases that include, but are not limited to, data related to movies, television programs, music, and restaurants. Different data sources may have their own content and update rate.

The search system 102 may retrieve data from one or more of the data sources 106. The data retrieved from the data sources 106 can include any type of data related to applications 116. Examples of data related to applications 116 include, but are not limited to, a name of an application, a description of an application, a substantive review of an application, a quality rating of an application, a developer name, an excerpt from a blog post about an application, a tweet about an application, tutorial videos, one or more images (e.g., icons and/or screenshots) associated with the application, and/or data related to application functionality. The search system 102 may also retrieve statistical data from the data sources 106. Statistical data may include any numerical data related to an application, such as a number of downloads, download rates (e.g., downloads per month), a number of reviews, and a number of ratings.

The data sources 106 may include sources of data which the search system 102 may utilize to generate and update the application record data store 114. For example, the search system 102 may use the data from one or more data sources 106 to update one or more databases, indices, tables, files, or other data structures included in the application record data store 114. The search system 102 may, for example, generate new application records 120 (e.g., application record 302 of FIG. 3A) and/or update existing application records 120 based on data retrieved from the data sources 106. Although not illustrated in FIG. 1, the search system 102 may include modules that generate new application records 120 and update existing application records 120 based on the data retrieved from data sources 106 (e.g., from the application developers 126A, digital distribution platforms 126B, blogs 126C, application reviews 126D, social networks 126E, and/or databases 126F). Some data included in the application record data store 114 may be manually generated.

The recommendation system 108 may determine one or more applications of potential interest to one or more users and/or user devices 104-1 . . . 104-N and provide recommendations. In some implementations, the recommendation system 108 may identify one or more applications associated with a requesting user device (e.g., user devices 104-1). For example, the recommendation system 108 may receive a set of application identifiers that identify applications that have been installed on a user device 104-1 (e.g., installed applications 122-1).

The recommendation system 108 may identify sets of application identifiers associated with other users and/or other user devices that are similar to the set of application identifiers associated with the requesting user device. In some implementations, the recommendation system 108 may compare the first set of application identifiers of the requesting user device with the similar sets of application identifiers of other user devices. The recommendation system 108 may identify applications of potential interest by determining one or more applications that are a member of the similar sets of other user devices but not a member of the set of application identifiers of the requesting user device. The recommendation system 108 may provide a recommendation to recommend any number of the applications of potential interest.

The recommendation system 108 may generate, receive, or retrieve a set of application identifiers (e.g., a first set of application identifiers) associated with a requesting user device (i.e., a user device requesting a recommendation of application(s) of potential interest) in any number of ways. In some embodiments, the requesting user may identify applications to be included in the set and provide the set of application identifiers to the recommendation system 108 and/or the search system 102 (which may, in turn, provide all or some of the application identifiers of the set to the recommendation system 108). The set of application identifiers of the requesting user may be included in the search query 124 or provided at any other suitable time.

In some embodiments, a user may allow an application on the user device 104-1 to provide a set of application identifiers to the recommendation system 108. For example, a client application on the user device 104-1 may provide application identifiers associated with applications of all or a part of the user device 104-1 (e.g., selected folders, directories, subdirectories, partitions, and/or the like). The client application may generate, update, and/or store a set of application identifiers. In some embodiments, the recommendation system 108 requests the application identifiers from the user device 104-1. With the user's permission, the client application may provide the set of application identifiers to the recommendation system 108.

In some embodiments, prior to the set of application identifiers being provided to the recommendation system 108, the user may review the set of application identifiers and make additions (e.g., adding one or more new application identifiers) and/or deletions (e.g., removing one or more application identifiers from the set). In some embodiments, the user device 104-1 may present a user interface including a list of application identifiers. The user may check or otherwise select the application identifiers from the list to provide to the recommendation system 108 the first set of application identifiers. The user device 104-1 may provide the (potentially user curated) set of applications identified to the recommendation system 108. In some implementations, the user may provide a list of application identifiers to the recommendation system 108 through a Web page, email, text message, or the like.

In various embodiments, the recommendation system 108 may detect and track when users or digital devices download one or more applications from one or more sources (e.g., a digital distribution platform). For example, digital distribution platform or a search engine may identify applications downloaded by a user and/or a user device 104 (e.g., user device 104-1). The digital distribution platform and/or search engine may provide the recommendation system 108 information such as, but not limited to, a user identifier, a user device identifier, an application identifier that identifies the application(s) that are downloaded, and/or the like. In some embodiments, one or more digital distribution platforms and/or data sources 106 may provide a report to the recommendation system 108 to assist in identifying applications for the set of application identifiers. The recommendation system 108 may utilize all or some information from the other sources to generate sets of application identifiers associated with one or more different users and/or one or more different user devices 104-1 . . . 104-N).

The set of application identifiers may identify applications that are currently installed and/or downloaded. In some embodiments, the set of application identifiers may identify applications that have been previously installed and/or downloaded in the past, even if those applications are not currently installed by the user or on the user device 104.

In various embodiments, the recommendation system 108 may receive a set of application identifiers of a requesting user device and, subsequently, may identify other sets of application identifiers of one or more other users based on similarity to the requesting user devices' set of application identifiers. Similarity between sets of application identifiers may be determined in any number of ways. In one example, similarity of sets is determined by calculating a similarity value. A similarity value is a value indicating a degree of similarity.

A similarity value may be a percentage of applications that are identified in multiple sets of applications. The recommendation system 108 may compare the percentage of common applications to a similarity threshold. If the percentage of common applications is greater than the similarity threshold, then the recommendation system 108 may identify the sets of application identifiers as similar. A similarity threshold is any threshold or value (e.g., 65%) which may be compared to the similarity value to indicate whether sets of application identifiers are sufficiently similar. In various embodiments, a minhash algorithm may be utilized to determine similarity between application sets.

In another example, the recommendation system 108 may determine that sets are similar by calculating a number of similar applications that are common to both sets of applications. If the number of similar applications (e.g., the similarity value) is greater than a minimum threshold (e.g., a similarity threshold), the recommendation system 108 may identify the sets of application identifiers as similar.

Once similar sets of application identifiers have been identified, the recommendation system 108 may identify one or more applications of potential interest by determining at least one application identifier in the other user's similar sets of application identifiers that are not in the requesting user device's set of application identifiers. The recommendation system 108 may store the identifiers that identify the application(s) of potential interest and/or provide a recommendation identifying one or more applications of potential interest.

In various embodiments, the recommendation system 108 may provide a recommendation 128 to the user and/or user device 104. The recommendation may include an application name that identifies an application of potential interest. The recommendation may include any number of application names that identify any number of applications of potential interest.

The set of application identifiers received, retrieved, or generated by the recommendation system 108 may include applications downloaded or installed by a user on any number of user devices. For example, the set of application identifiers may identify applications downloaded by the same user on multiple user devices such as a smartphone and a tablet. In various embodiments, the set of application identifiers includes applications downloaded or installed on a single digital device or a limited number of digital devices. In some embodiments, the set of application identifiers may include applications downloaded or installed by a group of users (e.g., a family, friends, association, or the like) on any number user devices.

In some implementations, a user device 104-1 may provide a search query 124 to the search system 102. The search query 124 may include a set of application identifiers (e.g., identifying the installed applications 122-1). The search query 124 may include a recommendation request. A recommendation request is a request for a recommendation of one or more applications of potential interest.

The search system 102 may receive the search query 124 and provide the recommendation request and/or the set of application identifiers from the search query 124 to the recommendation system 108. The recommendation system 108 may identify similar sets of application identifiers of other users (e.g., by determining similarity between the a set of application identifiers on the user device provided with the search query with previously stored sets of application identifiers of other users). The recommendation system 108 may identify applications of potential interest by determining those applications that are members of other users' similar sets of application identifiers but are not members of the set of application identifiers of the requesting user device. The recommendation system 108 may select any number of application identifiers to include in the recommendations 128. The recommendation system 108 may select any of the applications of potential interest to include in one or more recommendations in any number of ways.

In some embodiments, the recommendation system 108 provides the recommendations 128 to the user device 104-1 that provided the search query 124. In various embodiments, the recommendation system 108 provides the selected applications of interest (e.g., as recommendations) to the search system 102. The search system 102 may include links to any number of the selected applications of interest in the search results 210 that are provided to the user device 104-1.

FIG. 2 shows an exemplary application search module 112 which may be included in the search system 102 in some embodiments. The application search module 112 includes a query analysis module 202, an application set generation module 204 (hereinafter "set generation module 204"), and an application set processing module 206 (hereinafter "set processing module 206"). The query analysis module 202 analyzes a received search query 208 (e.g., search query 124). The set generation module 204 identifies a set of application identifiers 306 (see FIG. 3A) representative of applications based on the received query 208. The identified set of applications may be referred to herein as a "consideration set." The set processing module 206 processes (e.g., scores) the consideration set to generate a set of search results 210 that may include a list of applications corresponding to result scores.

As described above, the application record data store 114 includes data related to a plurality of different applications 116. The data associated with an application 116 may be referred to herein as an "application record" (e.g., application record 302a of FIG. 3A). Accordingly, the application record data store 114 may include a plurality of different application records (see record 120 in FIG. 1) that each include data related to a different application. The application record 302 of FIG. 3A may be the same or different than the record 120.

FIGS. 3A-3B illustrate application records 302a and 310, respectively, in some embodiments. Referring to FIG. 3A, an example application record 302a includes an application name 304, an application identifier 306 (e.g., which may be the same as application ID 118), and application attributes 308. The application record 302a may generally represent data stored in the application record data store 114 that is related to an application. The application record data store 114 may include a plurality of application records having a similar structure as the application record 302. Put another way, the application record data store 114 may include a plurality of application records having an application name 304, an application identifier 306, and application attributes 308.

The application name 304 may be the name of the application represented by the data in the application record 302. Example application names may include "GOOGLE MAPS," "FACEBOOK," "TWITTER," "MICROSOFT WORD," or "ANGRY BIRDS." The application identifier 120 (hereinafter "application identifier 306") identifies the application record 302 amongst the other application records included in the application record data store 114. For example, the application identifier 306 may uniquely identify the application record 302. The application identifier 306 may be a string of alphabetic, numeric, and/or symbolic characters (e.g., punctuation marks) that uniquely identify the application record 302 in which the application identifier 306 is included.

The application attributes 308 may include any type of data which may be associated with the application represented by the application record 302. The application attributes 308 may include a variety of different types of data. For example, the application attributes 308 may include structured, semi-structured, and/or unstructured data. The application attributes 308 may include information that is extracted or inferred from documents retrieved from the data sources 106. In some examples, the application attributes 308 may include data that is manually generated. The application attributes 308 may be updated so that up-to-date results can be provided in response to a user search query 208.

The application attributes 308 for an application 116 may include the name of the developer of the application, the publisher of the application, a category (e.g., genre) of the application, a description of the application (e.g., a developer's description), a version of the application, the operating system for the application, and the price of the application. The application attributes 308 for an application 116 may also indicate security or privacy data about the application, battery usage of the application, and bandwidth usage of the application.

The application attributes 308 may include application statistics. Application statistics may refer to numerical data related to the application. For example, application statistics may include, but are not limited to, a number of downloads, a download rate (e.g., downloads per month), a number of ratings, and a number of reviews. The application attributes 308 may also include information retrieved from Web sites such as reviews associated with the application, articles associated with the application (e.g., wiki articles), or other information. The application attributes 308 may also include digital media related to the application, such as images (e.g., icons and/or screenshots), tutorials, videos, and/or screencasts.

FIG. 3B shows an example application record 310 for the application (e.g., game) named "ANGRY BIRDS." The application record 310 includes the application name "ANGRY BIRDS" indicated at 312. The application record 310 includes an application identifier number indicated at 314. The application record 310 includes application attributes 316. The application attributes 316 include data fields for the name of the developer and the genre of the application. The developer of the application included in the application attributes 316 may be "ROVIO ENTERTAINMENT." The genre of the application may be "games." The application attributes 316 also includes fields for description and reviews. The description may include text that describes "ANGRY BIRDS." In some examples, the description may be provided by the developer of the application. The field for reviews may include text from user reviews in some examples.

The application attributes 316 also include fields for application statistics, such as ratings and the number of downloads. The ratings field may indicate the ratings given to the application 116 by the users. For example, the ratings may include a number of stars (e.g., 0-5 stars) assigned to the application 116 by the users. The number of downloads may indicate the total number of times the application has been downloaded.

Figure 4:
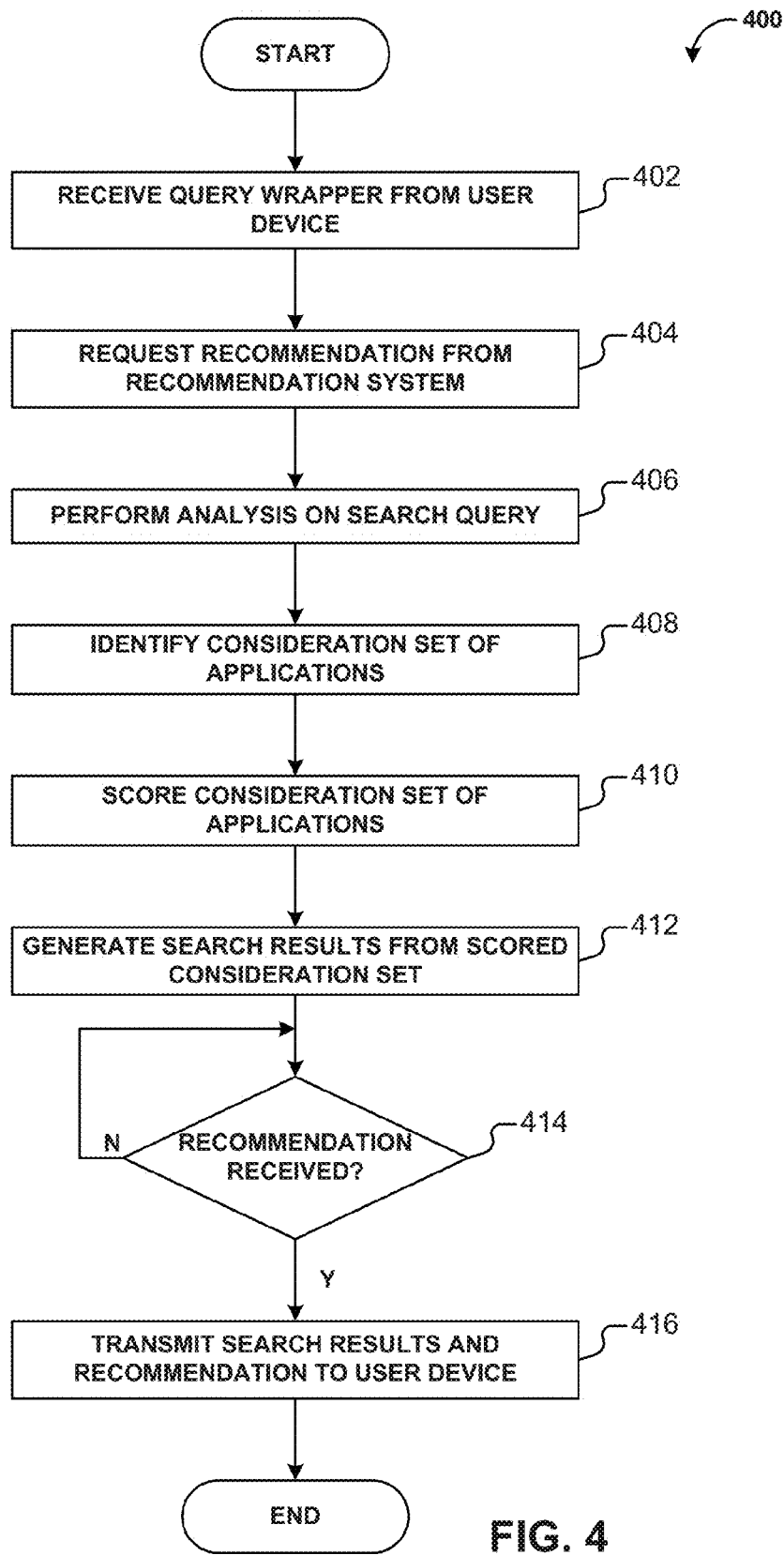
FIG. 4 shows an example method for performing a search for applications and adding a recommendation to the search results.

FIG. 4 shows an example method 400 for performing a search for applications and adding a recommendation to the search results. The method 400 is described with reference to the application search module 112 of FIG. 2. In step 402, the query analysis module 202 receives a query wrapper (containing a search query 208) generated by a user device 104-1. The search query 208 may include a recommendation request, a set of application identifiers, an identifier of the user device 104-1 that provided the search query 208, and/or an identifier of the user associated with the user device 104-1.

In step 404, the application search module 112 may request a recommendation from the recommendation system 108. The application search module 112 may provide all or a part of the recommendation request to the recommendation system 108. In one example, the application search module 112 may provide from the recommendation request a user identifier, a user device identifier, and/or a set of application identifiers associated with the user identifier and/or the user device identifier.

The recommendation system 108 may receive the set of application identifiers from the search system 102. In some embodiments, the recommendation system 108 may request the set of application identifiers from the user device 104-1 by directing the request to the user device 104-1 (e.g., using the identifier of the user device 104-1 and/or the identifier of the user from the search query 208).

Alternately, the recommendation system 108 may retrieve a previously stored set of application identifiers associated with the user device 104-1 and/or the user of the user device 104-1 (e.g., based on the identifier of the user device 104-1 and/or the identifier of the user from the recommendation request). In some embodiments, a set of application identifiers may be previously provided by a user or a user device 104-1 (e.g., by a client application) to the recommendation system 108 as described herein. The recommendation system 108 may store the set of application identifiers in a profile associated with the user and/or user device 104-1 for later retrieval.

The recommendation system 108 may identify similar sets of application identifiers of other users, identify applications of interest based on those applications identified in the similar sets of application identifiers of other users but not identified in the set of application identifiers of the requesting user device, and provide all or some identifiers of the identified applications of interest to the application search module 112 in step 414. Functions of the recommendation system 108 are described in more detail in FIGS. 6-11.

In step 406, the query analysis module 202 analyzes the search query 208. In step 408, the application set generation module 204 identifies a consideration set of application records based on the search query 208 (e.g., based on output from the query analysis module 202).

In step 410, the application set processing module 206 processes the consideration set of application records. The application set processing module 206 generates result scores (e.g., based on information contained in the record 120) for the application records included in the consideration set. The application set processing module 206 may select application records from the consideration set based on the result scores associated with the application records. For example, the application set processing module 206 may select application records having the largest result scores.

The application set processing module 206 may select application download addresses (e.g., mechanisms that allow a user and/or a user device 104 to download or learn more about one or more native applications) from the selected application records.

In step 412, the application set processing module 206 generates search results from the scored consideration set. The search results may include a list of the selected application download addresses.

In step 414, the search module 112 may determine if a recommendation is received from the recommendation system 108. In some embodiments, once the recommendation system 108 provides a recommendation and/or one or more identifiers of the applications of potential interest to the application search module 112, the application set processing module 206 transmits the search results to the user device 104-1 that generated the search query 208 in step 416. In some embodiments, if no recommendation and/or one or more identifiers of the applications of potential interest are received by the application search module 112 within a predetermined duration of time or the search module 112 otherwise receives a message to proceed (e.g., an error message) from the recommendation system 108, the search module 112 may provide search results without the recommendation.

Figure 5:
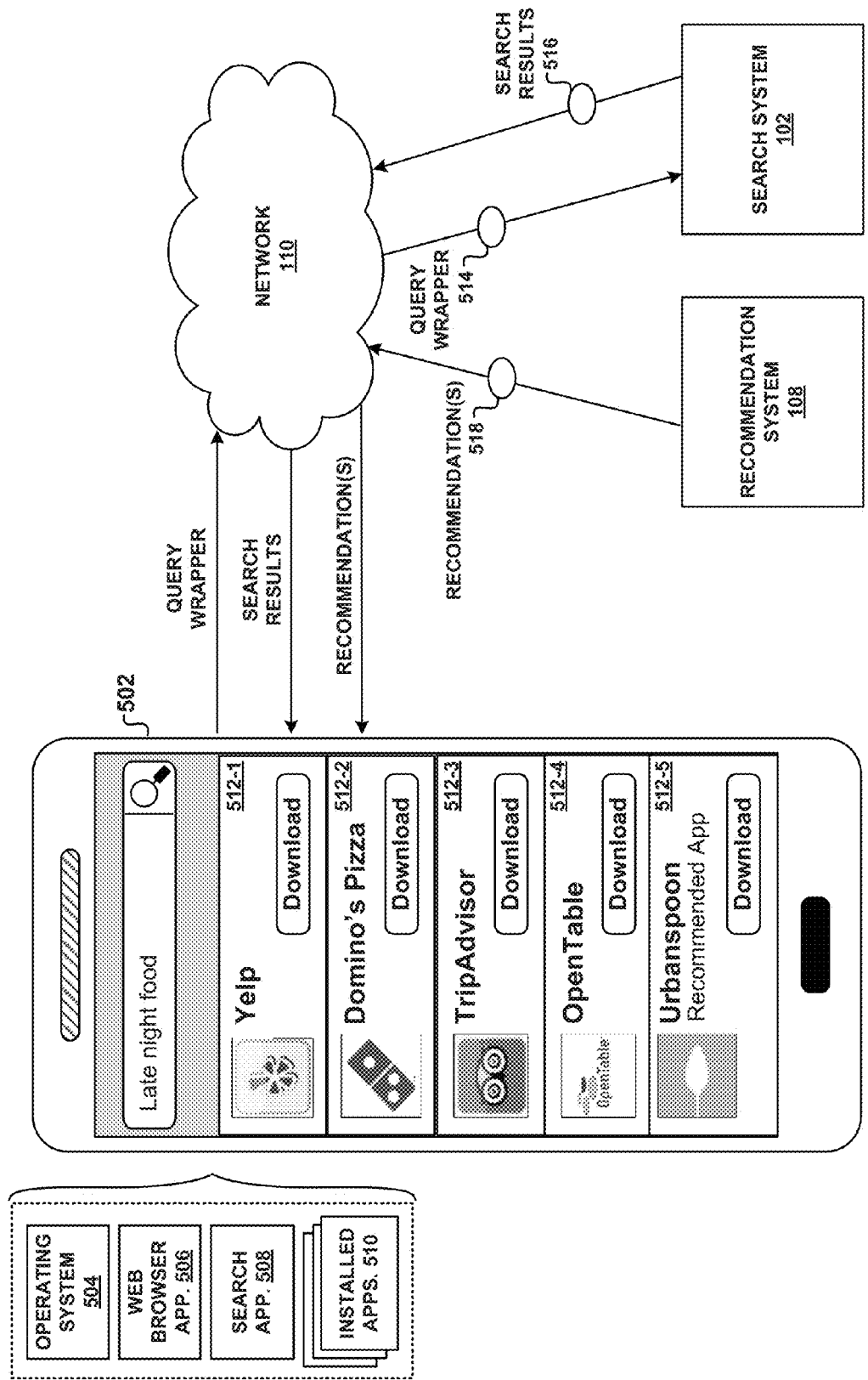
FIG. 5 shows example interaction between the user device, search system, and recommendation system.

FIG. 5 shows example interaction between the user device 502, search system 102, and recommendation system 108. The user device 502 may include an operating system 504, Web browser 506, search application 508, and installed applications 510 (i.e., native applications). The user device 502 may be any digital device. In some examples, the user device 502 may be any of the user devices 104-1 . . . 104-N.

In some implementations, the user device 502 sends a query wrapper 514 to the search system 102. The query wrapper 504 includes a search query (e.g., search query 208) and other contextual data that the search system 102 uses to generate search results 516. The query wrapper 514 can also include data that indicates applications that are installed on the user device (e.g., a set of application identifiers that identify any number of the installed applications 510).

A graphical user interface (GUI) may display the search results 516 as a list of links (e.g., links 512 of FIG. 5) arranged under the search field in which the user entered the search query. The user device 502 may arrange the links in any order (e.g., based on result scores from the search system 102). For example, the user device 104 may arrange the links in order by a score of a relevance of each application listed to the search query 124.

The search results include links 512-1, 512-2 . . . 512-4 (collectively "links 512"). Each of the links 512 include link data. For example, each of the links 512 includes an image (e.g., an application icon) and text (e.g., application name) that describes the native application. Each of the links 512 may be associated with an application download address such that when the user selects a link, the user device 502 downloads and/or previews the associated native application. In some embodiments, when the user selects the link the user device 502 may activate a browser or other application to access information (e.g., a Web page) about a native application associated with the application download address.

In various embodiments, the search application 508 or other client application may identify one or more downloaded or installed applications on the user device 502. For example, the search application 508 or client application may receive application names from a user or scan all or parts of the user device 502. In some embodiments, the user may give permission for a client application to detect when all or some new applications are downloaded and/or installed on the user device 502. The client application may then generate a set of application identifiers associated with the detected applications.

The recommendation system 108 provides one or more recommendations 518 to the user device 502. The recommendation 518 may include a recommendation to download an application (e.g., an application of potential interest). The recommendation 518 could be provided to the user of the user device 502 in a variety of different ways (e.g., in search results 516, upon opening the search application 508, or the like). In one example, the recommendation 518 could include information to be displayed along with search results 516 (e.g., the recommended applications of interest being identified as a "recommended app").

In the example of FIG. 5, the Urbanspoon application 512-5 is being recommended to the user. The Urbanspoon link (user selectable link) can be selected (e.g., touched/clicked) to access a digital distribution platform (e.g., GOOGLE PLAY) that provides the Urbanspoon application. Although a recommendation link is shown in the search results 516, recommendations could be made in other ways and at other times. For example, the links could have a different format (e.g., text without images). The links could be shown when the search application is started, in response to the user requesting recommendations in the search application 508 (e.g., via a recommendation button in the GUI of the search app), or at other times (e.g., in response to a similar user profile newly adding the application).

Figure 6:
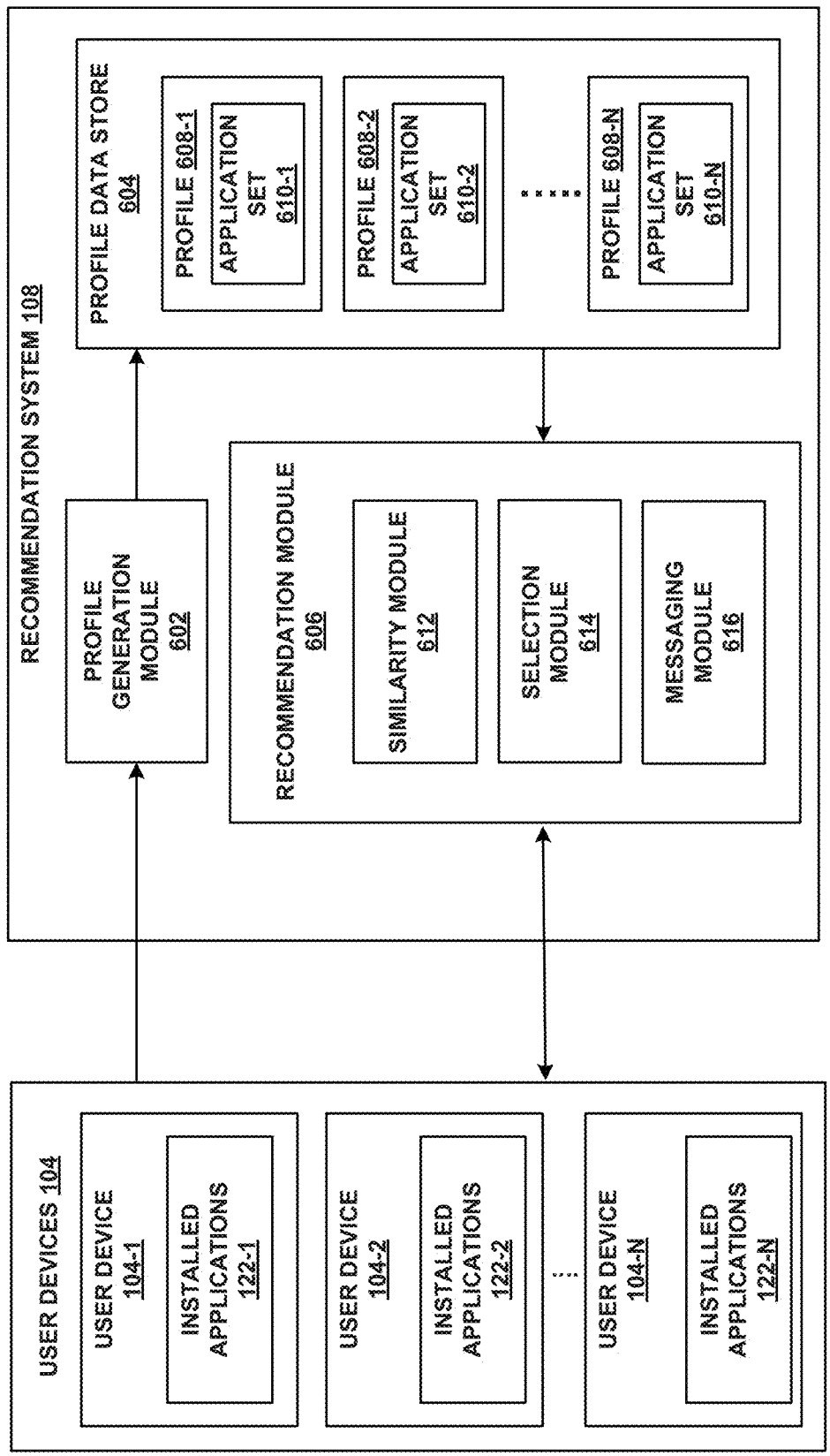
FIG. 6 shows an example recommendation system in communication with the user devices in some embodiments.

FIG. 6 shows an example recommendation system 108 in communication with the user devices 104 in some embodiments. As discussed regarding FIG. 1, each user device 104 includes "installed applications" that represent applications installed on the user device. For example, each user device 104-1 . . . 104-N may include installed applications 122-1 . . . 122-N, respectively. The recommendation system 108 includes a profile generation module 602, a profile data store 604, and a recommendation module 606.

The profile generation module 602 may generate one or more user profiles and store the user profile(s) in the profile data store 604. For example, the profile generation module 602 may generate user profile 608-1 and store user profile 608-1 in the profile data store 604. Each profile by may be associated with a user, group of users, user device, or group of user devices. Each user profile may include a set of application identifiers (e.g., user profile 608-1 may include an application set 610-1). As discussed herein, the set of application identifiers may identify applications installed and/or downloaded by a user on any number of user devices 104 (e.g., user device 104-1 such as a smartphone and user device 104-2 such as a tablet).

The set of application identifiers may identify one or more applications that are not currently installed and/or downloaded. For example, any or all of the set of applications identifiers may identify applications that may have been previously installed on the user device but were subsequently uninstalled, deleted, and/or removed.

In some implementations, there may be one user profile for each user device. For example, application set 610-1 of user profile 608-1 may identify one or more installed applications 122-1 of the user device 104-1. The profile generation module 602 may identify the applications installed on a user device 104-1 in a variety of different ways. In one example, the profile generation module 602 may identify applications based on data in a query wrapper that indicates one or more applications 122-1 installed on the user device 104-1. The profile generation module 602 may identify one or more of the applications stored on the user device 104-1 in other manners as well. For example, a user may intentionally share the list of installed applications 122-1 so that recommendations can be provided.

The recommendation module 606 may recommend one or more applications of potential interest to a requesting user in any number of ways. For example, the recommendation module 606 may identify a second user profile 608-2 that is similar to the user profile 608-1 of the requesting user (i.e., the requesting user's profile 608-1). Two user profiles may be similar if a high number (e.g., meeting or exceeding a numeric threshold such as a first similarity threshold) or a percentage (e.g., meeting or exceeding a percentage threshold such as a second similarity threshold) of the applications identified in one of the sets is the same or similar to applications identified in the other set. After determining whether the two profiles and/or two application sets are similar, the recommendation module 606 may identify an application included in the second user profile 608-2 (e.g., within the application set 610-2) that is not included in the requesting user's profile 608-1 (e.g., within the application set 610-1). The recommendation module 606 may then recommend the identified application to the requesting user (e.g., as an application of potential interest). In FIG. 6, the recommendation module 606 may perform any or all operations in real time (e.g., in response to a request for a recommendation).

In some embodiments, the recommendation system 108 includes a similarity module 612, a selection module 614, and a messaging module 616. The similarity module 612 is configured to determine similarity between or among any number of application sets. The similarity module 612 may determine similarity in any number of ways. For example, the similarity module 612 may compare membership of any number of application sets to identify applications that are common members of the application set(s). In some embodiments, the similarity module 612 may determine a number of applications that are common members of the application set(s) and/or a percentage of applications that are common members of the application set(s).

The similarity module 612 may compare the applications that are similar between or among the application set(s) to one or more similarity thresholds. For example, the similarity module 612 may determine that application sets are similar if the number of applications that are common members of the application sets exceeds a minimum threshold (e.g., a first similarity threshold). In another example, the similarity module 612 may determine that applications sets are similar if the percentage of applications that are common members of the application sets (e.g., a second similarity value) exceeds a percentage threshold (e.g., a second similarity threshold). The similarity module 612 may determine similarity by comparing against any number of thresholds (e.g., utilizing both the minimum threshold and the percentage threshold to determine similarity). In some embodiments, the similarity module 612 may apply rules (e.g., set by an administrator) to determine similarity of membership of application sets.

The similarity module 612 may, in some embodiments, filter out application identifiers from the requester's set of application identifiers. For example, the similarity module 612 may remove preinstalled applications, private applications with sensitive information (e.g., medical applications, adult oriented applications), or the like.

In various embodiments, the similarity module 612 may consider applications to be similar between two application sets even if the application sets contain different versions of the same application or the like. For example, two application sets may both include a particular gaming application but the versions may be different (e.g., one application set includes version 1.2 of the particular gaming application and the other application set includes version 2.3 of the particular gaming application). Even though the gaming application identified in both application sets are different versions, the similarity module 612 may consider the gaming application as similar (e.g., a member of both application sets). Alternately, the similarity module 612 may not consider different versions of applications identified in both application sets as similar or consider different versions of the application as similar only if the two different versions are closely related software releases (e.g., versions 2.0 and 2.01).

The selection module 614 is configured to identify applications that are not common between similar application sets. For example, the similarity module 612 may identify similar application sets 610-1 and 610-2 as described herein. The selection module 614 may identify applications that are identified in one of application sets 610-2 and not the other application set 610-1. The selection module 614 may consider the identified applications as being applications of potential interest to the user (or user device 104-1) associated with user profile 608-1.

The selection module 614 may select or prioritize any number of the applications of potential interest for recommendation. For example, there may be five applications that are members of the application set 610-2 that are not members of the application set 610-1 even though the application sets 610-1 and 610-2 are similar. The selection module 614 may prioritize all five applications to indicate which application(s) should be recommended to the user or user device 104-1 first. The selection module 614 may, in some embodiments, select only some of the applications of potential interest to recommend and not others.

The selection module 614 may select and/or prioritize applications of potential interest in any number of ways. In some embodiments, the selection module 614 may select and/or prioritize a limited number of applications of potential interest (e.g., 1 or 2) to include in a recommendation. The selection module 614 may include any number of rules to assist in governing the selection and/or prioritization process. One rule, for example, may require that the selection module 614 only select applications of potential interest (e.g., versions) that have been released less than a predetermined duration of time (e.g., less than six months) or after a predetermined time frame (e.g., after Jan. 1, 2014). Another rule may require that the selection module 614 select only popular applications based on a list of popular applications and/or not select unpopular (e.g., malware or buggy) applications based on a list of unpopular applications.

In another example, the selection module 614 may identify any applications of potential interest that have been recommended to the user in the past and reduce priority for those applications in order to provide new recommendations. Alternately, the selection module 614 may re-categorize an application as not an application of potential interest if the user has already received a recommendation in the past for the same application. In some embodiments, the selection module 614 may determine applications that have been previously provided in a past recommendation based on the user's profile, which may include information regarding the user's past recommendations.

In various embodiments, the selection module 614 may prioritize applications of potential interest (e.g., place a higher priority) that are related to advertisers or other entities.

The messaging module 616 is configured to generate a recommendation including identifiers of the application(s) of potential interest selected and/or prioritized by the selection module 614. The recommendation may include information regarding the application(s) of potential interest or link data (see discussion regarding FIG. 5 herein) that may allow a user to download, install, and/or view information regarding the identified application(s) of potential interest.

In various embodiments, the messaging module 616 may provide the recommendation to the user device 104 (e.g., user device 104-1). Alternately, the messaging module 616 may provide the recommendation to the search system 102 to incorporate recommendation(s) in search results as described herein. The messaging module 616 may provide the recommendation to any digital device or any number of digital devices (e.g., to a digital distribution platform to display recommendations to any number of users). In some embodiments, the messaging module 616 may include in a recommendation one or more application identifiers associated with an advertiser or other entity.

Figure 7:
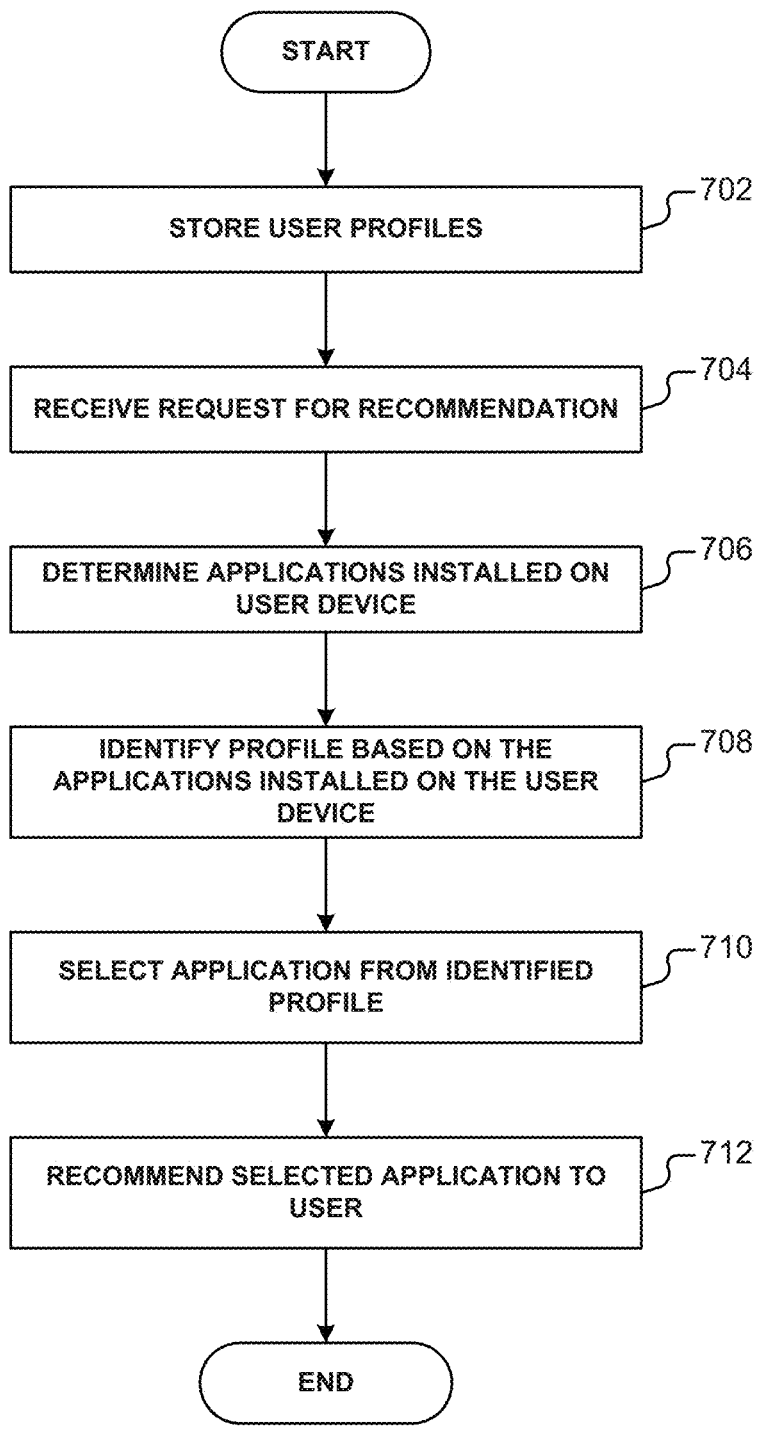
FIG. 7 shows an example method for providing a recommendation in some embodiments.

FIG. 7 is a flowchart for providing a recommendation in some embodiments. In step 702, the profile generation module 602 stores user profiles in the profile data store 604. In one example, the recommendation system 108 may receive (e.g., from a user device 104, a search system 102, or an application data store) any number of sets of application identifiers associated with any number of users and/or a user devices 104-1 . . . 104-N. The profile generation module 602 may associate the sets of application identifiers with any number of user profiles. The profile generation module 602 may store the user profiles and/or the sets of application identifiers in the profile data store 604.

In step 704, the recommendation system 108 may receive a recommendation request from a requesting user. The recommendation request may identify a user and/or user device 104-1. In step 706, the profile generation module 602 may obtain or otherwise receive a set of application identifiers associated with the user and/or user device 104-1 associated with the recommendation request.

The profile generation module 602 may obtain or otherwise receive a set of application identifiers associated with the user and/or user device 104-1 in any number of ways. The profile generation module 602 may determine if the user or user device 104-1 is associated with a preexisting user profile that may already have a set of application identifiers that identify all or some of the installed applications 122-1. In some embodiments, the profile generation module 602 may receive the set of application identifiers from the user device 104-1 (e.g., provided by the user or software on the user device 104-1) and/or may receive the first set of application identifiers from any other source (e.g., search system 102 or data sources 106 such as an application data store).

In step 708, the similarity module 612 may identify a profile of other users based on the applications installed on the requesting user's device. The similarity module 612 may identify application sets stored within the profile data store 604 which are similar to the set of application identifiers associated with the user and/or user device 104-1. The similarity module 612 may compare members of any number of application sets. The similarity module 612 may identify applications that are common members of the application sets. For example, the similarity module 612 may determine a number of applications that are common members of the application sets and/or a percentage of applications that are common members of the application sets. If a sufficient number or percentage of applications are common in two or more sets, the similarity module 612 may determine that the sets are similar.

In step 710, the selection module 614 selects applications of potential interest from the similar application sets. For example, the selection module 614 may identify applications that are identified in one or more other user's similar application set(s) but are not in the requesting user's set of application identifiers. The selection module 614 may consider the identified applications as being applications of potential interest to the user (or user device 104-1) that provided the recommendation request.

The selection module 614 may select or prioritize any number of the applications of potential interest for the recommendation. The selection module 614 may, in some embodiments, select only some of the applications of potential interest to recommend and not others.

In step 712, the recommendation module 606 recommends one or more of the selected and/or prioritized applications of potential interest. The recommendation module 606 may provide the recommendation to the user, user device 104-1, application data store, and/or search system 102 in any number of ways.

Figure 8:
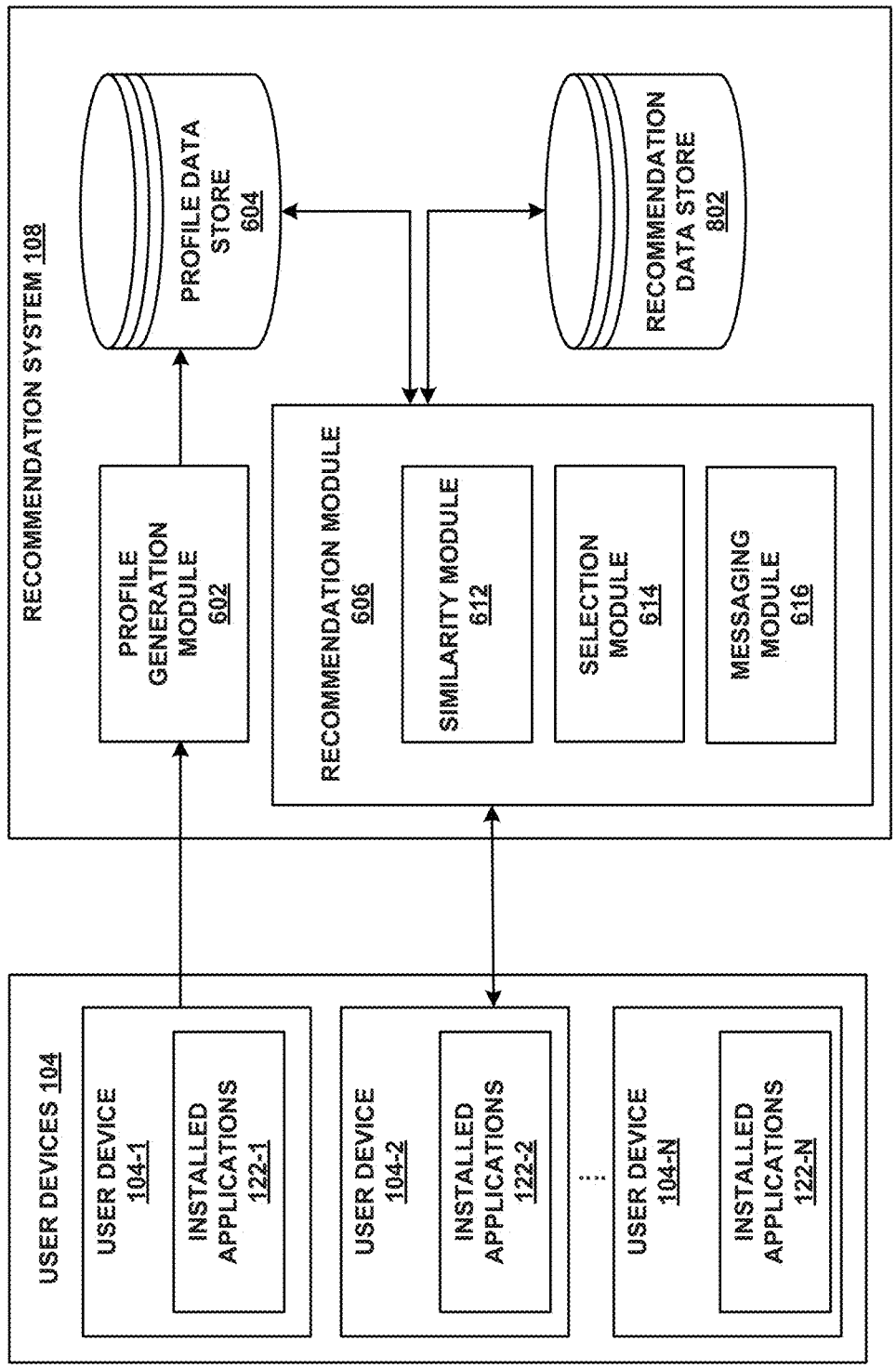
FIG. 8 shows an example recommendation system with a recommendation data store in communication with the user devices in some embodiments.

FIG. 8 shows an example recommendation system 108 with a recommendation data store 802 in communication with the user devices 104 in some embodiments. The recommendation system 108 identifies applications to recommend in an offline manner and stores the recommendations for a plurality of user devices in the recommendation data store 802. Each user device 104 includes "installed applications" that represent applications installed on the user device. For example, each user device 104-1 . . . 104-N may include installed applications 122-1 . . . 122-N, respectively. Information contained within the recommendation data store 802 may be encrypted or otherwise safeguarded.

As discussed regarding FIG. 6, the profile generation module 602 may generate one or more user profiles and store the user profiles in the profile data store 604. For example, the profile generation module 602 may generate user profile 608-1 and store user profile 608-1 in the profile data store 604. Each user profile may, for example, include a set of application identifiers (e.g., user profile 608-1 may include an application set 610-1).

As discussed regarding FIG. 6, there may be one user profile for each user device. For example, an application set of a user profile may identify one or more installed applications 122-1 of the user device 104-1. The recommendation module 606 may recommend an application of potential interest to a requesting user in any number of ways.

The recommendation module 606 may identify a second user set of application identifiers from a second user profile that is similar to the requesting user's set of application identifiers from the requesting user's profile. Two application sets may be similar if a high number (e.g., meeting or exceeding a number threshold) or a percentage (e.g., meeting or exceeding a percentage threshold) of the applications identified in one of the sets is the same or similar to applications identified in the other set. After determining whether the two sets are similar, the recommendation module 606 may identify an application included in the second user profile 608-2 (e.g., within the application set 610-2) that are not included in the first user profile 608-1 (e.g., within the application set 610-1). The recommendation module 606 may then recommend the identified application to the first user (e.g., as an application of potential interest).

As discussed regarding FIG. 6, the recommendation module 606 may perform the operations in real time (e.g., in response to a request for a recommendation). For example, the recommendation system 108 may receive a request for a recommendation, retrieve or receive a first set of application identifiers, determine similarity with one or more other sets of application identifiers, and provide one or more recommendations.

The recommendation system 108 may not wait until a recommendation request is received to perform any or all functions. For example, the recommendation system 108 may retrieve or receive a first set of application identifiers at any time. Similarly, the recommendation system 108 may determine similarity between the first set of application identifiers and one or more other sets of application identifiers at any time.

The recommendation system 108 may determine one or more applications of potential interest to a user and/or user device(s) and store identifiers that identify the applications of potential interest (associated with the user) within the recommendation data store 802. The stored identifiers that identify applications of potential interest may be provided as recommendations to a user at any time. As a result, all or some of the processing of determining similarity and/or identifying applications of potential interest may be performed before a recommendation request is received. The recommendation module 606 may retrieve any number of previously stored identifiers of applications of potential interest from the recommendation data store 802 when needed.

In one example, the user device 104-1 may provide a recommendation request to the profile generation module 602. The profile generation module 602 may retrieve a user identifier, user device identifier, or any identifier from the recommendation request and determine if a profile associated with the user and/or user device 104-1 has been created. If a profile associated with the user and/or user device 104-1 has been created, the recommendation module 606 may determine if the profile indicates that applications of potential interest have already been identified for the user and/or a recommendation has already been generated for the user and/or user device 104-1. If the profile indicates that one or more recommendations have been generated for the user and/or user device 104-1 that have not been previously provided, the messaging module 616 may provide the recommendation from the recommendation data store 802 to the user and/or user device 104-1.

If a recommendation has not been generated, but the profile indicates that applications of potential interest have already been generated, the selection module 614 may retrieve the identifiers of applications of potential interest from the recommendation data store 802. The selection module 614 may select and/or prioritize any number of the retrieved identifiers of applications of potential interest for recommendation. Subsequently, the messaging module 616 may provide a list of any or all of the selected and/or prioritized applications of potential interest to the user, user device 104-1, search system 102, and/or any other device.

In some embodiments, the profile may indicate sets of application identifies that are similar. For example, the similarity module 612 may determine which sets are sufficiently similar as described herein and store information regarding the similarity of application identifiers sets in the profile data store 604 and/or the recommendation data store 802. When a recommendation request is received, the similarity module 612 may determine that application sets that are similar to the application set of the requester have already been identified and stored in the recommendation data store 802. The selection module 614 may identify and prioritize applications of potential interest based on the similar sets of application identifiers and the requester's set of application identifiers as discussed herein. The messaging module 616 may provide the recommendation based on the prioritized applications of interest.

Figure 9:
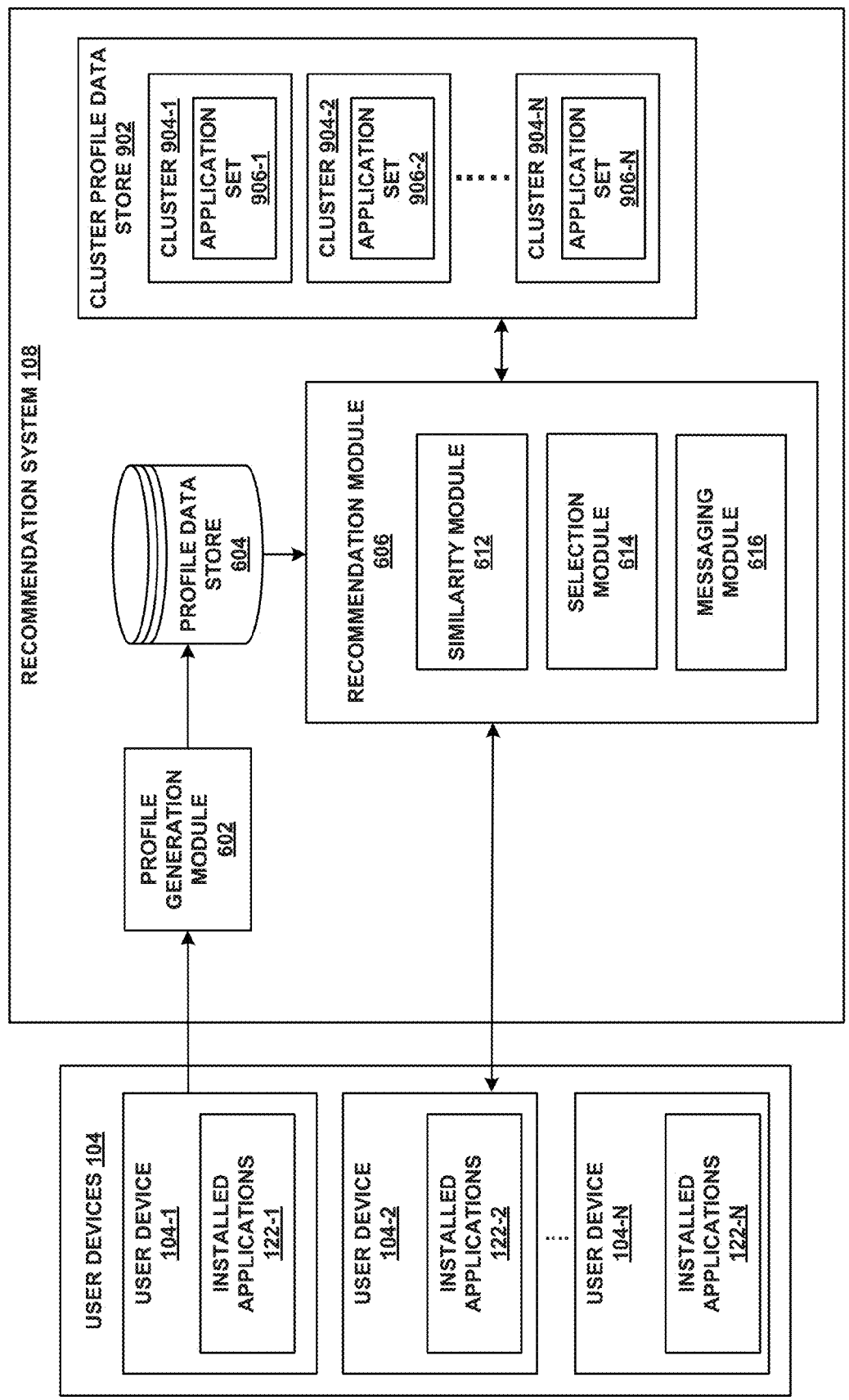
FIG. 9 shows an example recommendation system with a cluster profile data store in communication with the user devices in some embodiments.

FIG. 9 shows an example recommendation system 108 with a cluster profile data store 902 in communication with the user devices 104 in some embodiments. The cluster profile data store 902 may store clusters (e.g., clusters 904-1 . . . 904-N) that include application sets 906-1 . . . 906-N, respectively. A cluster may identify a set of applications that are related (e.g., by type and/or by groups of users). For example, a cluster may identify one or more categories that classify types of applications of an application set (e.g., a category cluster). In another example, the cluster may include one or more groups of users associated with applications identified in an application set (e.g., a group cluster). There may be clusters of any type.

In some embodiments, a category cluster identifies a set of applications that are related by one or more classifications(s). For example, a "news" profile may identify a "news" cluster which identifies a set of application identifiers related to news (e.g., CNN or the WALL STREET JOURNAL). A "gamer" profile may identify a "games" cluster which identifies a set of application identifiers related to games. There may be any number of category clusters.

In various embodiments, a recommendation request may request applications of potential interest related to a category. The similarity module 612 may receive and/or retrieve a requesting user's set of application identifiers based on information from the recommendation request (e.g., user identifier, user device 104-1 identifier, or any identifier) as discussed herein. The similarity module 612 may retrieve a cluster 904-1 based on the information from the recommendation request (e.g., a category cluster identifier that identifies a "sports" cluster). The cluster 904-1 may include, or be associated with, application set 906-1, which identifies applications related to sports.

The selection module 614 may identify applications that are not common between the requesting user's set of application identifiers and the application set 906-1 as discussed. For example, the selection module 614 may identify applications that are identified in application set 906-1 and not in the requesting user's set of application identifiers. The selection module 614 may consider the identified applications as being applications of potential interest to the user (or user device 104-1).

The selection module 614 may select or prioritize any number of the applications of potential interest for recommendation. In some embodiments, the selection module 614 may select only some of the applications of potential interest to recommend and not others.

As discussed herein, the messaging module 616 is configured to generate a recommendation including identifiers of the application(s) of potential interest selected and/or prioritized by the selection module 614. The recommendation may include information regarding the application(s) of potential interest or link information that may allow a user to download, install, and/or view information regarding the identified application(s) of potential interest.

In various embodiments, the messaging module 616 may provide the recommendation to the user device 104 (e.g., user device 104-1). In some embodiments, the messaging module 616 may provide the recommendation to the search system 102 to incorporate recommendation(s) in search results as described herein. The messaging module 616 may provide the recommendation to any digital device or any number of digital devices (e.g., to a digital distribution platform to display recommendations to any number of users).

In some embodiments, a recommendation request may include group information to request applications of potential interest related to groups of individuals. For example, the group information of the recommendation request may include a group identifier identifying a group, individual user identifiers, and/or device identifiers that are members of one or more groups.

The similarity module 612 may receive and/or selection module 614 may retrieve the requesting user's set of application identifiers based on information from the recommendation request (e.g., user identifier, user device 104-1 identifier, or any identifier) as discussed herein. The selection module 614 may retrieve a cluster 904-2 based on the group information of the recommendation request. For example, the selection module 614 may utilize a group identifier to identify a cluster 904-2 (e.g., a group cluster) and retrieve the application set 906-2 from the cluster profile data store 902. In some embodiments, the selection module 614 may utilize a group identifier to identify a cluster that is related to a subgroup (e.g., a set of the group that is smaller than the whole group).

In some embodiments, the selection module 614 may utilize demographic information or the like to select one or more clusters from the cluster profile data store 902. For example, the selection module 614 may identify characteristics identified in the group information (e.g., interests, age, activities, gender, geographical information, educational background, and/or the like) and identify one or more clusters of the cluster profile data store 902 that are related to the identified characteristics. The selection module 614 may retrieve the application set(s) from the identified clusters.

The selection module 614 may identify applications that are not common between the requesting user's set of application identifiers and the application sets retrieved from the cluster profile data store 902 (e.g., application set 906-2). For example, the selection module 614 may identify applications that are identified in application set 906-2 and not in the requesting user's set of application identifiers. The selection module 614 may consider the identified applications as being applications of potential interest to the user (or user device 104-1).

The selection module 614 may select or prioritize any number of the applications of potential interest for recommendation. The selection module 614 may, in some embodiments, select only some of the applications of potential interest to recommend and not others. As discussed herein, the messaging module 616 is configured to generate a recommendation including identifiers of the application(s) of potential interest selected and/or prioritized by the selection module 614. The recommendation may include information regarding the application(s) of potential interest or link data that may allow a user to download, install, and/or view information regarding the identified application(s) of potential interest.

The recommendation module 606 may identify any number of applications of potential interest regarding any number of clusters.

Figure 10:
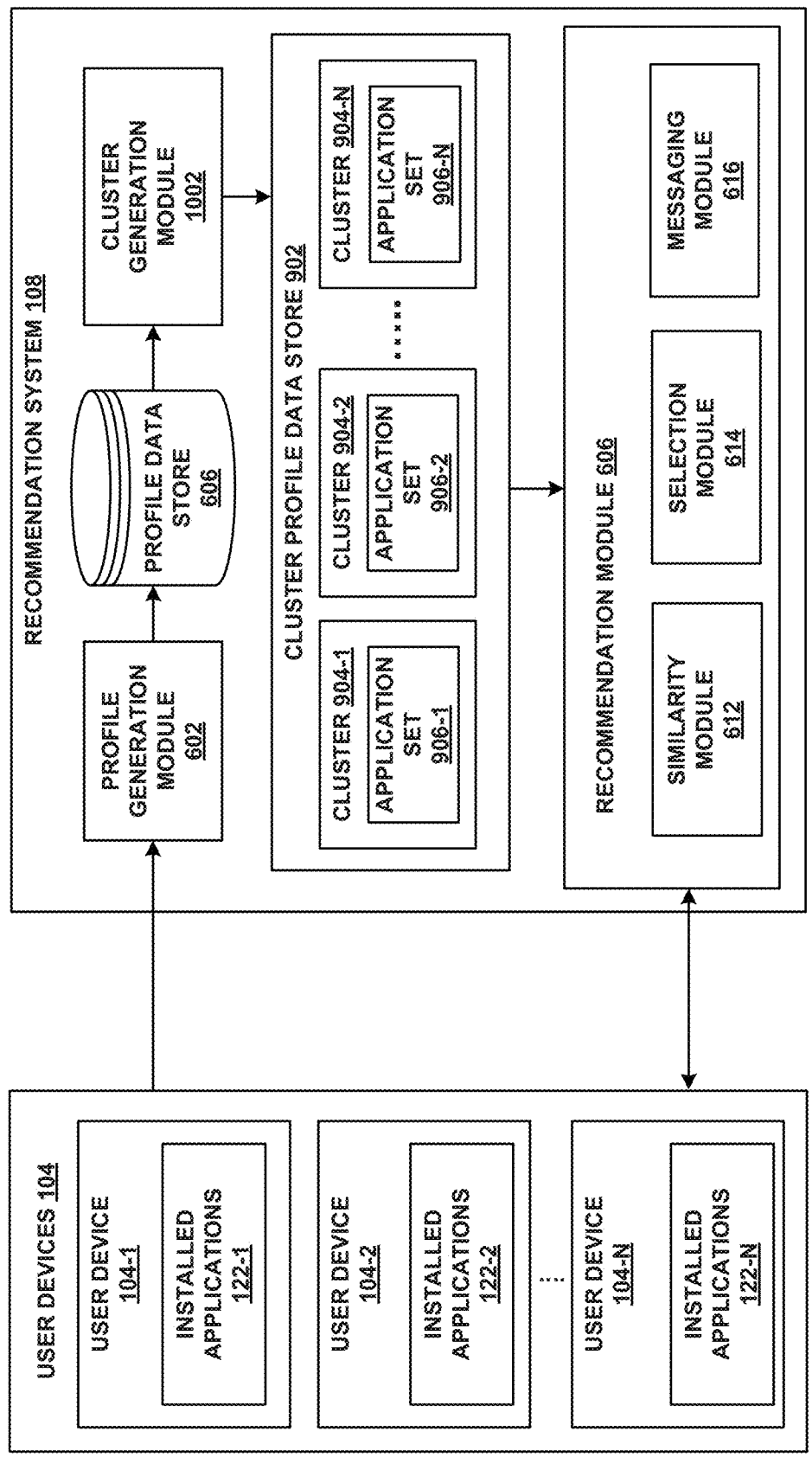
FIG. 10 shows an example recommendation system with a cluster generation module and a cluster profile data store in communication with the user devices in some embodiments.

FIG. 10 shows an example recommendation system 108 with a cluster generation module 1002 and a cluster profile data store 902 in communication with the user devices 104 in some embodiments. In various embodiments, the cluster generation module 1002 may generate the clusters 904-1 . . . 904-N and the application sets 906-1 . . . 906-N in any number of ways. For example, clusters may be identified manually (e.g., by an administrator). An administrator or user may, for example, identify a group (e.g., for a group cluster) or a special interest (e.g., for a classification cluster). The cluster generation module 1002, similarity module 612, administrator, and/or user may identify application sets associated with the group or special interest. The cluster generation module 1002 or similarity module 612 may compare the applications in the application sets to identify applications that are common or generally common between or among the application sets to generate the application set associated with the cluster.

For example, the cluster generation module 1002 or the similarity module 612 may retrieve or obtain information (e.g., from the profile data store 606 and/or the recommendation data store 802) to identify applications sets associated with the group or special interest. The recommendation module 606 may receive application sets of user devices 104, application data stores, and/or the like.

The cluster generation module 1002 or the similarity module 612 may identify applications that are common or generally common between or among the application sets in any number of ways. In some embodiments, the similarity module 612 may identify applications that are identified in all of the application sets that are related to the group of special interest.

Additionally or alternatively, cluster generation module 1002 or the similarity module 612 may identify applications that are in most but not all of the application sets that are related to the group or special interest. For example, the cluster generation module 1002 may determine a percentage of the application sets that share one or more applications to the total number of applications sets related to the group or special interest. The cluster generation module 1002 may determine that if the percentage exceeds a percentage threshold (e.g., a majority), then the cluster generation module 1002 may include the one or more applications in the application sets in the cluster (e.g., application set 906-1 of cluster 904-1).

In another example, the cluster generation module 1002 may compare a total number of application sets that share one or more applications to a minimum threshold number. The cluster generation module 1002 may determine that if the total number of application sets that share one or more applications exceeds the minimum threshold number, then the cluster generation module 1002 may include the one or more applications in the application set of the cluster (e.g., application set 906-1 of cluster 904-1).

The cluster profile data store 902 may store clusters (e.g., clusters 904-1 . . . 904-N) that include application sets 906-1 . . . 906-N, respectively, generated by the cluster generation module 1002.

In various embodiments, a recommendation request may request applications of potential interest related to a category. The similarity module 612 may receive and/or retrieve a requesting user's set of application identifiers based on information from the recommendation request (e.g., user identifier, user device 104-1 identifier, or any identifier) as discussed herein. The similarity module 612 may retrieve a cluster 904-1 based on the information from the recommendation request. The cluster 904-1 may include, or be associated with, application set 906-1, which may have been generated previously by the cluster generation module 1002.

The selection module 614 may identify applications that are not common between the requesting user's set of application identifiers and the application set 906-1 as discussed. For example, the selection module 614 may identify applications that are identified in application set 906-1 and not in the requesting user's set of application identifiers. The selection module 614 may consider the identified applications as being applications of potential interest to the user (or user device 104-1).

The selection module 614 may select or prioritize any number of the applications of potential interest for recommendation. In some embodiments, the selection module 614 may select only some of the applications of potential interest to recommend and not others.

As discussed herein, the messaging module 616 is configured to generate a recommendation including identifiers of the application(s) of potential interest, selected and/or prioritized by the selection module 614. The recommendation may include information regarding the application(s) of potential interest or link information that may allow a user to download and/or view information regarding the identified application(s) of potential interest.

In various embodiments, the messaging module 616 may provide the recommendation to the user device 104 (e.g., user device 104-1). In some embodiments, the messaging module 616 may provide the recommendation to the search system 102 to incorporate recommendation(s) in search results as described herein. The messaging module 616 may provide the recommendation to any digital device or any number of digital devices (e.g., to a digital distribution platform to display recommendations to any number of users).

Clustering algorithms could be based on user behavior patterns (e.g., click patterns), text based features, or implemented in another way. The clusters may be generated offline. Clusters could also be based on sensors on a device, popularity of apps, geographic areas, demographics, popular games, developer, franchise, or the like.

Figure 11:
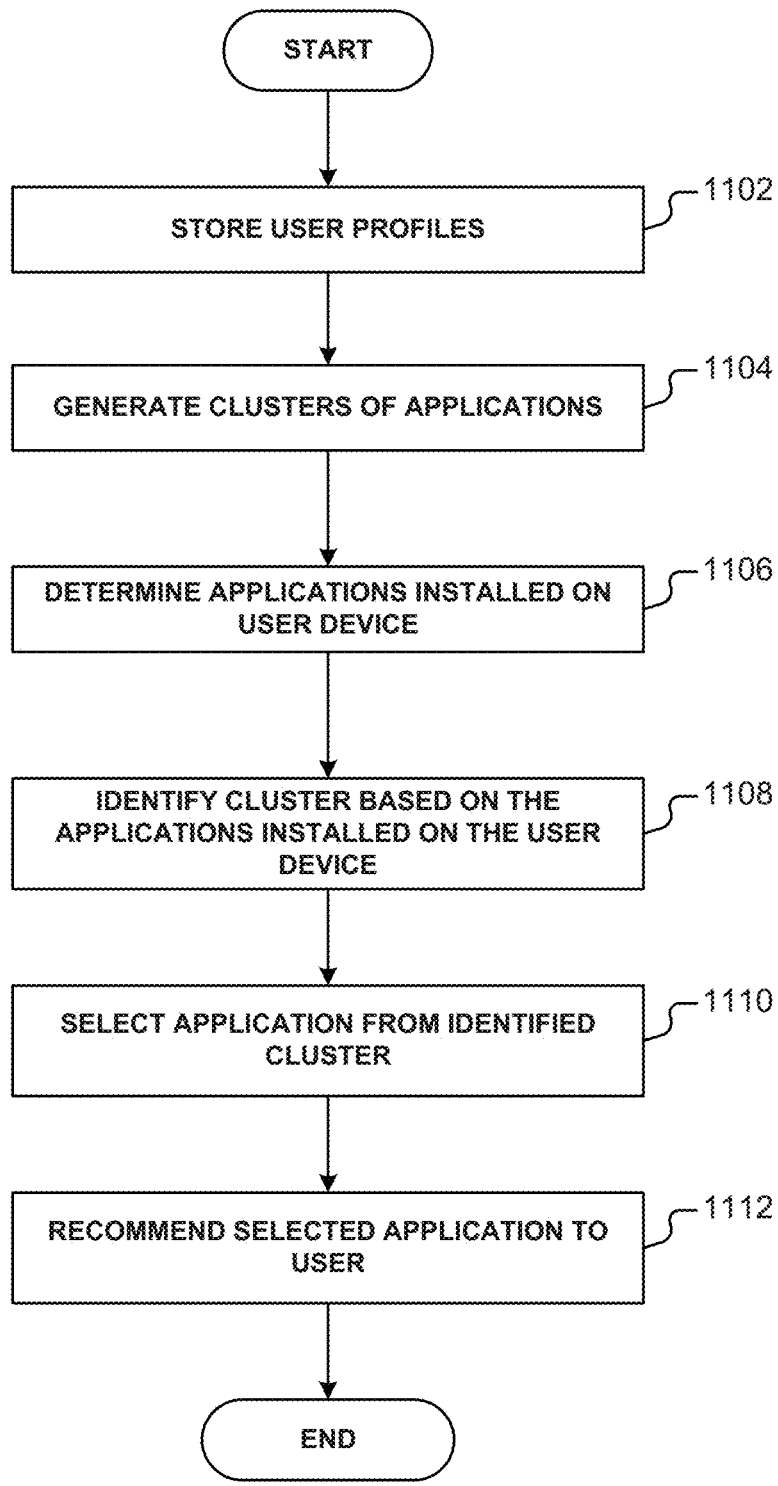
FIG. 11 shows an example method for generating clusters of applications for use in making recommendations.

FIG. 11 shows an example method for generating clusters of applications for use in making recommendations. In step 1102, the profile generation module 602 stores user profiles in the profile data store 604. In one example, the recommendation system 108 may receive (e.g., from a user device 104, a search system 102, or an application data store) any number of sets of application identifiers associated with any number of users and/or a user devices 104-1 . . . 104-N. The profile generation module 602 may associate the sets of application identifiers with any number of user profiles. The profile generation module 602 may store the user profiles and/or the sets of application identifiers in the profile data store 604.

In step 1104, the cluster generation module 1002 may generate one or more clusters that identify applications. For example, an administrator, user, or the recommendation system 108 may identify one or more groups or one or more categories. The cluster generation module 1002 may retrieve or obtain information (e.g., from the profile data store 604) to identify applications sets associated with the group or categor(ies). The cluster generation module 1002 or the similarity module 612 may identify applications that are common or generally common between or among the application sets. The cluster generation module 1002 and/or similarity module 612 may identify applications that are common or generally common between or among application sets using analytics (e.g., determining applications identified among the sets utilizing a Gaussian distribution to omit applications that are uncommon) or any other techniques. The cluster generation module 1002 may store the clusters (e.g., clusters 904-1 . . . 904-N) that include application sets 906-1 . . . 906-N, respectively, in the cluster profile data store 902.

In step 1106, the profile generation module 602 may determine applications installed (e.g., installed applications 122-1) on a user device 104-1. For example, the profile generation module 602 may receive a recommendation request from the user device 104-1. The profile generation module 602 may identify the user and/or the user device 104-1 from the recommendation request (e.g., the recommendation request may include a user identifier or a user device 104-1 identifier). The profile generation module 602 may determine if the user or user device 104-1 is associated with a preexisting user profile that may already have a set of application identifiers that identify all or some of the installed applications 122-1. In some embodiments, the profile generation module 602 may receive the requesting user's set of application identifiers from the user device 104-1 (e.g., provided by the user or software on the user device 104-1), may scan the user device 104-1 (e.g., utilizing software on the user device 104-1 or functionality downloaded from a Web page), and/or may receive all or some of the requesting user's set of application identifiers from any other source (e.g., search system 102, application data store, or other data sources 106).

In step 1108, the recommendation module 606 may identify a cluster based on the applications installed on the user device (e.g., the requesting user's set of application identifiers). For example, the similarity module 612 or the cluster generation module 1002 may identify common application types in the requesting user's set of application identifiers (e.g., games, sports, news, fitness, or the like). The similarity module 612 or the cluster generation module 1002 may identify common application types in any number of ways. For example, the similarity module 612 or the cluster generation module 1002 may determine that if a number of applications in the requesting user's set of application identifiers of a specific type exceed a threshold, then the similarity module 612 or the generation module 1002 may identify the applications as common application types. Subsequently, the similarity module 612 and/or the cluster generation module 1002 may retrieve a cluster associated with the specific type of common application (e.g., sports). In another example, the similarity module 612 or the cluster generation module 1002 may determine that a percentage of the specific type of application in the requesting user's set of application identifiers when compared to all of the applications in the set exceed a threshold. Subsequently, the similarity module 612 and/or the cluster generation module 1002 may retrieve a cluster associated with the specific type of application.

In step 1110, the selection module 614 may identify applications that are not common between the requesting user's set of application identifiers and the application set 906-1 of the cluster. For example, the selection module 614 may identify applications that are identified in application sets 906-1 and not in the requesting user's set of application identifiers. The selection module 614 may consider the identified applications as being applications of potential interest to the user (or user device 104-1).

The selection module 614 may select or prioritize any number of the applications of potential interest for recommendation. In some embodiments, the selection module 614 may select only some of the applications of potential interest to recommend and not others.

The messaging module 616 is configured to generate a recommendation including identifiers of the application(s) of potential interest, selected and/or prioritized by the selection module 614. The recommendation may include information regarding the application(s) of potential interest or link information that may allow a user to download, install, and/or view information regarding the identified application(s) of potential interest.

In step 1112, the messaging module 616 may provide the recommendation to the user device 104 (e.g., user device 104-1).

Figure 12:
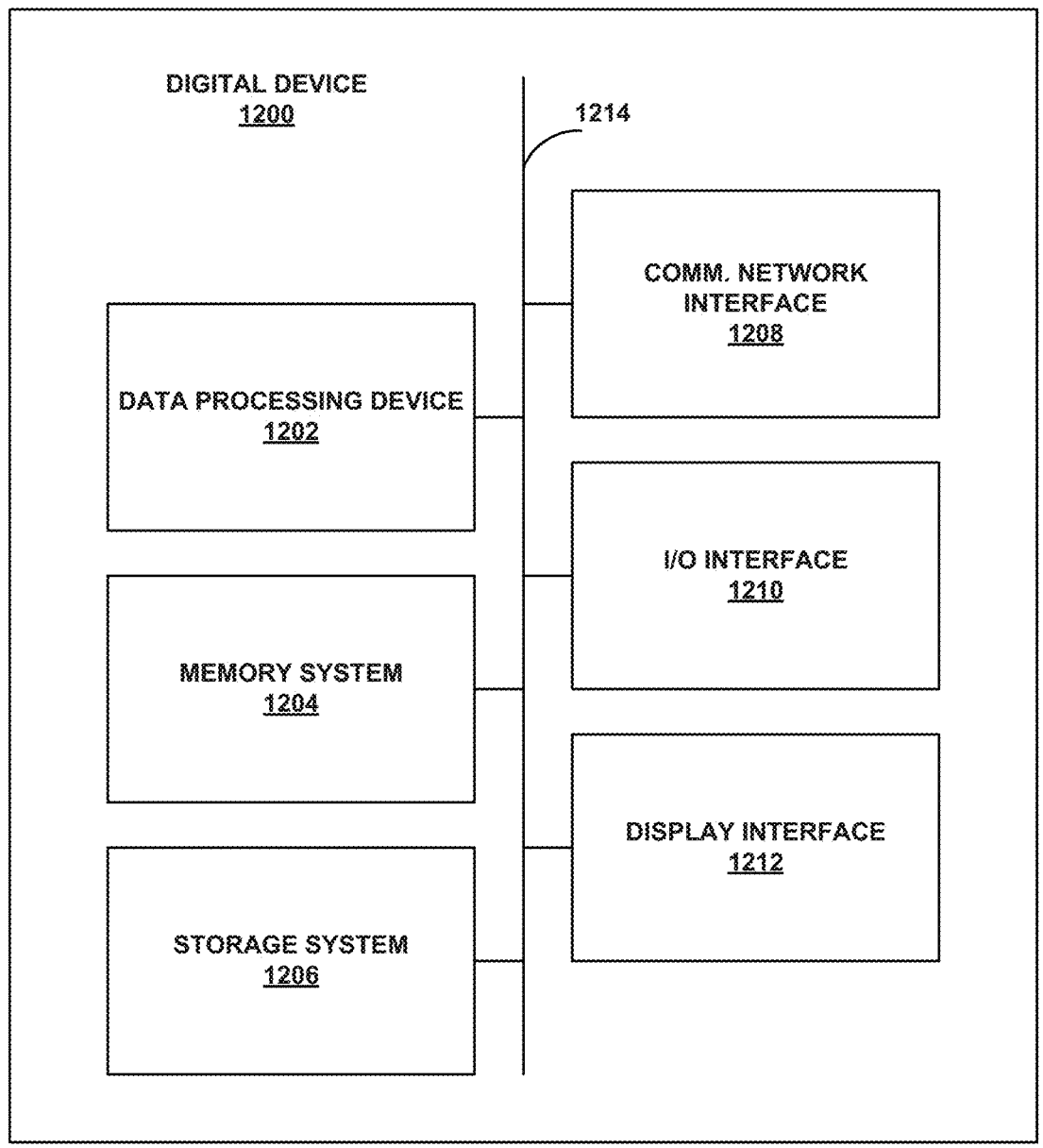
FIG. 12 is a functional block diagram of a digital device.

FIG. 12 is a functional block diagram of a digital device 1200. The digital device 1200 includes a data processing device 1202 (e.g., a processor), a memory system 1204 (e.g., non-transitory memory), a storage system 1206, a communication network interface 1208, an I/O interface 1210, and a display interface 1212 communicatively coupled to a bus 1214. The data processing device 1202 is in communication with the memory system 1204, the storage system 1206, the communication network interface 1208, the I/O interface 1210, and the display interface 1212. The data processing device 1202 is also configured to execute executable instructions (e.g., programs stored on the memory system 1204 or the storage system 1206). In some examples, the data processing device 1202 includes circuitry or any data processing device capable of processing the executable instructions.

The memory system 1204 is any non-transitory memory configured to store data. Some examples of the memory system 1204 are storage devices, such as RAM or ROM. The memory system 1204 can comprise the ram cache. The data within the memory system 1204 may be cleared or ultimately transferred to the storage system 1206.

The storage system 1206 is any storage configured to retrieve and store data. Some examples of the storage system 1206 are flash drives, hard drives, optical drives, and/or magnetic tape. The storage system 1206 may comprise non-transitory media. In some implementations, the digital device 1200 includes a memory system 1204 in the form of RAM and a storage system 1206 in the form of flash data. Both the memory system 1204 and the storage system 1206 include computer readable media which may store instructions or programs that are executable by a computer processor including the data processing device 1202.

The communication network interface (comm. network interface) 1208 can be coupled to a network (e.g., network 110) via the link 1214. The communication network interface 1208 may support communication over an Ethernet connection, a serial connection, a parallel connection, or an ATA connection, for example. The communication network interface 1208 may also support wireless communication (e.g., 802.11 a/b/g/n, WiMax, 3G, 4G, LTE and the like). Moreover, the communication network interface 1208 can support many wired and wireless standards.

The optional input/output (I/O) interface 1210 is any device that receives input from the user and outputs data. The optional display interface 1212 is any device that is configured to output graphics and data to a display. In some examples, the display interface 1212 is a graphics adapter. While not all digital devices include either the I/O interface 1210 or the display interface 1212, the digital device 1200 may include either, both, or none.

The hardware elements of the digital device 1200 are not limited to those depicted in FIG. 12. A digital device 1200 may comprise more or less hardware elements than those depicted. Further, hardware elements may share functionality and still be within various implementations described herein. In some examples, encoding and/or decoding may be performed by the data processing device 1202 and/or a co-processor located on a graphics processing unit (GPU).

The above-described functions and components can be comprised of instructions that are stored on a storage medium such as a computer readable medium (e.g., a non-transitory computer readable medium). The instructions can be retrieved and executed by a data processing device. Some examples of instructions are software, program code, and firmware. Some examples of storage medium are memory devices, tape, disks, integrated circuits, and servers. The instructions are operational when executed by the data processing device to direct the data processing device to operate in accord with embodiments of the present disclosure. Those skilled in the art are familiar with instructions, data processing device(s), and storage medium.

The present disclosure is described above with reference to exemplary embodiments. It will be apparent to those skilled in the art that various modifications may be made and other embodiments can be used without departing from the broader scope of the present disclosure. Therefore, these and other variations upon the exemplary embodiments are intended to be covered by the present disclosure.

The invention claimed is:

1. A method of improving functionality of a first user device comprising:
   receiving, by a transceiver included in a recommendation system, a first set of application identifiers identifying applications downloaded or installed on the first user device and associated with a first user;
   comparing, by a processor included in the recommendation system, the first set of application identifiers to a second set of application identifiers identifying applications downloaded or installed at least one other user device;
   generating, by the processor included in the recommendation system, a similarity value based on the comparison by determining similarity between the first and second sets of application identifiers;
   when the similarity value exceeds a similarity threshold, determining, by the processor included in the recommendation system, that the first and second sets are sufficiently similar;
   if the first and second sets are sufficiently similar:
      determining, by the processor included in the recommendation system, at least one application identifier in the second set that is not in the first set; and
      providing, by the transceiver included in the recommendation system, a recommendation to the first user device, the recommendation including the at least one application identifier in the second set that is not in the first set.

2. The method of claim 1, wherein the first user device is a mobile device.

3. The method of claim 1, wherein the recommendation further includes at least one interactive element providing the first user device with download or view information about the at least one application associated with the application identifier in the recommendation.

4. The method of claim 1, wherein receiving, by the transceiver included in the recommendation system, the first set of application identifiers identifying applications downloaded or installed by the first user device comprises:
   identifying, by the processor included in the recommendation system, applications downloaded or installed on the first user device; and
   generating, by the processor included in the recommendation system, the first set of application identifiers, the first set of application identifiers identifying at least one of the identified applications downloaded or installed on the first user device.

5. The method of claim 1, wherein receiving, by the transceiver included in the recommendation system, the first set of application identifiers identifying applications downloaded or installed by the first user device comprises:
   identifying, by the processor included in the recommendation system, applications downloaded or installed by the first user device from the web site; and
   generating, by the processor included in the recommendation system, the first set of application identifiers, the first set of application identifiers identifying at least one of the identified applications downloaded or installed by the first user device.

6. The method of claim 1, wherein comparing, by the processor included in the recommendation system, the first set of application identifiers to the second set of application identifiers identifying applications downloaded or installed by the least one other user device comprises comparing, by the processor included in the recommendation system, the first set of application identifiers to the second set of application identifiers identifying applications downloaded or installed by a group of other user devices.

7. The method of claim 6, further comprising identifying, by the processor included in the recommendation system, the group of other user devices from a plurality of groups based on at least one characteristic of the first user device.

8. The method of claim 6, wherein the second set of application identifiers identifying applications downloaded or installed by the group of other user devices includes application identifiers identifying applications downloaded and installed by a subgroup of a larger group.

9. The method of claim 8, wherein the subgroup is at least a majority of the larger group.

10. A recommendation system configured to improve functionality of a first user device, the recommendation system comprising:
    a transceiver; and
    a processor, the processor configured to:
       receive, by the transceiver, a first set of application identifiers identifying applications downloaded or installed on the first user device and associated with a first user,
       compare the first set of application identifiers to a second set of application identifiers identifying applications downloaded or installed by at least one other user device,
       generate a similarity value based on the comparison by determining similarity between the first and second sets of application identifiers,
       when the similarity value exceeds a similarity threshold, to determine that the first and second sets are sufficiently similar,
       if the first and second sets are sufficiently similar, determine at least one application identifier in the second set that is not in the first set, and
       provide, by the transceiver, a recommendation to the first user device, the recommendation including the at least one application identifier in the second set that is not in the first set.

11. The recommendation system of claim 10, wherein the recommendation system is a mobile device.

12. The recommendation system of claim 10, wherein the recommendation further includes at least one interactive element providing the first user device with download or view information about the at least one application associated with the application identifier in the recommendation.

13. The recommendation system of claim 10, wherein the processor configured to receive, by the transceiver, the first set of application identifiers identifying applications downloaded or installed by the first user device comprises the processor being further configured to:
   identify applications downloaded or installed, on the first user device, and
   generate the first set of application identifiers, the first set of application identifiers identifying at least one of the identified applications downloaded or installed on the first user device.

14. The recommendation system of claim 10, wherein the processor configured to receive the first set of application identifiers identifying applications downloaded or installed by the first user device comprises the processor being further configured to:
   identify applications downloaded or installed by the first user device from a web site; and
   generate the first set of application identifiers, the first set of application identifiers identifying at least one of the identified applications downloaded or installed by the first user device.

15. The recommendation system of claim 10, wherein the processor configured to compare the first set of application identifiers to the second set of application identifiers identifying applications downloaded or installed by the least one other user comprises the processor being further configured to compare the first set of application identifiers to the second set of application identifiers identifying applications downloaded or installed by a group of other user devices.

16. The recommendation system of claim 15, wherein the processor is further configured to identify the group of other user devices from a plurality of groups based on at least one characteristic of the first user device.

17. The recommendation system of claim 15, wherein the second set of application identifiers identifying applications downloaded or installed by the group of other user devices includes application identifiers identifying applications downloaded and installed by a subgroup of a larger group.

18. The recommendation system of claim 17, wherein the subgroup is at least a majority of the larger group.

19. A non-transitory computer readable medium comprising executable instructions, the instructions being executable by a data processing device to perform a method of improving functionality of a first user device, the method comprising:
   receiving, by a transceiver, a first set of application identifiers identifying applications downloaded or installed on the first user device and associated with a first user;
   comparing, by the data processing device, the first set of application identifiers to a second set of application identifiers identifying applications downloaded or installed by at least one other user device associated with at least one other user;
   generating, by the data processing device, a similarity value based on the comparison by determining similarity between the first and second sets of application identifiers;
   when the similarity value exceeds a similarity threshold, determining, by the data processing device, that the first and second sets are sufficiently similar; and
   if the first and second sets are sufficiently similar:
      determining, by the data processing device, at least one application identifier in the second set that is not in the first set; and
      providing, by the transceiver, a recommendation to the first user device, the recommendation including the at least one application identifier in the second set that is not in the first set.

* * * * *